US007941533B2

(12) United States Patent
Miller et al.

(10) Patent No.: US 7,941,533 B2
(45) Date of Patent: May 10, 2011

(54) SYSTEM AND METHOD FOR SINGLE SIGN-ON SESSION MANAGEMENT WITHOUT CENTRAL SERVER

(75) Inventors: Lawrence R Miller, New York, NY (US); Bruce J. Skingle, Cambridge (GB)

(73) Assignee: JPMorgan Chase Bank, N.A., New York, NY (US)

( * ) Notice: Subject to any disclaimer, the term of this patent is extended or adjusted under 35 U.S.C. 154(b) by 1860 days.

(21) Appl. No.: 10/078,687

(22) Filed: Feb. 19, 2002

(65) Prior Publication Data
US 2003/0158949 A1     Aug. 21, 2003

(51) Int. Cl.
*G06F 15/173* (2006.01)
(52) U.S. Cl. ......... 709/225; 709/217; 709/227; 709/229
(58) Field of Classification Search .......... 709/227–229, 709/225, 217; 726/17, 18
See application file for complete search history.

(56) References Cited

U.S. PATENT DOCUMENTS

| | | |
|---|---|---|
| 3,896,266 A | 7/1975 | Waterbury |
| 3,938,091 A | 2/1976 | Atalla et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,220,501 A | 6/1993 | Lawlor |
| 5,233,654 A | 8/1993 | Harvey et al. |
| 5,235,509 A | 8/1993 | Mueller et al. |

(Continued)

FOREIGN PATENT DOCUMENTS
EP     0917119     5/1999
(Continued)

OTHER PUBLICATIONS

Kutler, A Different Drummer on the Data Highway, American Banker, Section: No. 91, vol. 160, May 12, 1995, p. 14.

(Continued)

*Primary Examiner* — Ramsey Refai
(74) *Attorney, Agent, or Firm* — Goodwin Procter LLP

(57) ABSTRACT

A method and system for single sign-on session management. Functions of session management and client log-in, normally handled by separate system servers, are incorporated as plug-in modules on individual web content servers. In this manner, network traffic to grant and validate client user credentials is reduced or minimized.

42 Claims, 13 Drawing Sheets

U.S. PATENT DOCUMENTS

| | | |
|---|---|---|
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,317,683 A | 5/1994 | Hager et al. |
| 5,321,841 A | 6/1994 | East |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,469,576 A * | 11/1995 | Dauerer et al. .................. 726/2 |
| 5,473,143 A | 12/1995 | Vak |
| 5,473,732 A | 12/1995 | Change |
| 5,485,370 A | 1/1996 | Moss et al. |
| 5,506,961 A * | 4/1996 | Carlson et al. ............... 713/200 |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davis et al. |
| 5,546,452 A | 8/1996 | Andrews |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,197 A | 12/1996 | Chen |
| 5,590,199 A | 12/1996 | Krajewski et al. |
| 5,592,378 A | 1/1997 | Cameron |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn |
| 5,603,025 A | 2/1997 | Tabb |
| 5,604,490 A | 2/1997 | Blakley et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,642,515 A * | 6/1997 | Jones et al. .................. 710/220 |
| 5,644,493 A | 7/1997 | Motai |
| 5,653,914 A | 8/1997 | Holmes et al. |
| 5,657,383 A | 8/1997 | Gerber |
| 5,657,388 A * | 8/1997 | Weiss ........................ 713/185 |
| 5,659,165 A | 8/1997 | Jennings |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Gray |
| 5,761,647 A | 6/1998 | Boushy |
| 5,761,661 A | 6/1998 | Coussens |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schneier et al. |
| 5,774,122 A | 6/1998 | Kojima |
| 5,778,178 A | 7/1998 | Arunachalam |
| 5,784,562 A | 7/1998 | Diener |
| 5,787,403 A | 7/1998 | Randle |
| 5,787,404 A | 7/1998 | Fernandez-Holmann |
| 5,790,650 A | 8/1998 | Dunn |
| 5,790,785 A | 8/1998 | Klug et al. |
| 5,793,861 A | 8/1998 | Haigh |
| 5,794,178 A | 8/1998 | Caid |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,805,803 A * | 9/1998 | Birrell et al. .................. 713/201 |
| 5,815,657 A | 9/1998 | Williams et al. |
| 5,815,683 A | 9/1998 | Vogler |
| 5,818,936 A | 10/1998 | Moshayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |
| 5,832,460 A | 11/1998 | Bednar |
| 5,832,476 A | 11/1998 | Tada |
| 5,835,087 A | 11/1998 | Herz |
| 5,835,580 A | 11/1998 | Fraser |
| 5,835,603 A | 11/1998 | Coutts |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West et al. |
| 5,845,260 A | 12/1998 | Nakano et al. |
| 5,847,709 A | 12/1998 | Card |
| 5,848,143 A | 12/1998 | Andrews |
| 5,848,400 A | 12/1998 | Chang |
| 5,848,427 A | 12/1998 | Hyodo |
| 5,852,812 A | 12/1998 | Reeder |
| 5,857,079 A | 1/1999 | Claus et al. |
| 5,862,223 A | 1/1999 | Walker |
| 5,864,830 A | 1/1999 | Armetta et al. |
| RE36,116 E | 2/1999 | McCarthy |
| 5,870,718 A | 2/1999 | Spector |
| 5,870,724 A | 2/1999 | Lawlor |
| 5,870,725 A | 2/1999 | Bellinger et al. |
| 5,871,398 A | 2/1999 | Schneier et al. |
| 5,873,072 A | 2/1999 | Kight |
| 5,873,096 A | 2/1999 | Lim |
| 5,880,769 A | 3/1999 | Nemirofsky |

| Patent | Type | Date | Inventor(s) |
|---|---|---|---|
| 5,883,810 | A | 3/1999 | Franklin et al. |
| 5,884,032 | A | 3/1999 | Bateman |
| 5,884,270 | A | 3/1999 | Walker et al. |
| 5,884,272 | A | 3/1999 | Walker et al. |
| 5,884,274 | A | 3/1999 | Walker et al. |
| 5,884,288 | A | 3/1999 | Chang |
| 5,889,863 | A | 3/1999 | Weber |
| 5,892,900 | A | 4/1999 | Ginter et al. |
| 5,898,780 | A | 4/1999 | Liu et al. |
| 5,899,982 | A | 5/1999 | Randle |
| 5,903,881 | A | 5/1999 | Schrader |
| 5,909,486 | A | 6/1999 | Walker et al. |
| 5,910,988 | A | 6/1999 | Ballard |
| 5,913,202 | A | 6/1999 | Motoyama |
| 5,914,472 | A | 6/1999 | Foladare et al. |
| 5,915,244 | A | 6/1999 | Jack et al. |
| 5,918,214 | A | 6/1999 | Perkowski |
| 5,918,217 | A | 6/1999 | Maggioncalda |
| 5,918,239 | A | 6/1999 | Allen et al. |
| 5,920,847 | A | 7/1999 | Kolling et al. |
| 5,921,864 | A | 7/1999 | Walker et al. |
| 5,923,763 | A | 7/1999 | Walker et al. |
| 5,926,796 | A | 7/1999 | Walker et al. |
| 5,926,812 | A | 7/1999 | Hilsenrath |
| 5,930,764 | A | 7/1999 | Melchione |
| 5,933,816 | A | 8/1999 | Zeanah |
| 5,933,817 | A | 8/1999 | Hucal |
| 5,933,823 | A | 8/1999 | Cullen |
| 5,933,827 | A | 8/1999 | Cole |
| 5,940,812 | A | 8/1999 | Tengel et al. |
| 5,943,656 | A | 8/1999 | Crooks |
| 5,944,824 | A | 8/1999 | He |
| 5,945,653 | A | 8/1999 | Walker et al. |
| 5,946,388 | A | 8/1999 | Walker et al. |
| 5,947,747 | A | 9/1999 | Walker et al. |
| 5,949,044 | A | 9/1999 | Walker et al. |
| 5,949,875 | A | 9/1999 | Walker et al. |
| 5,950,173 | A | 9/1999 | Perkowski |
| 5,950,174 | A | 9/1999 | Brendzel |
| 5,950,206 | A | 9/1999 | Krause |
| 5,952,639 | A | 9/1999 | Ohki |
| 5,952,641 | A | 9/1999 | Korshun |
| 5,953,710 | A | 9/1999 | Fleming |
| 5,956,695 | A | 9/1999 | Carrithers et al. |
| 5,958,007 | A | 9/1999 | Lee et al. |
| 5,960,411 | A | 9/1999 | Hartman et al. |
| 5,961,593 | A | 10/1999 | Gabber et al. |
| 5,963,635 | A | 10/1999 | Szlam et al. |
| 5,963,925 | A | 10/1999 | Kolling et al. |
| 5,963,952 | A | 10/1999 | Smith |
| 5,963,953 | A | 10/1999 | Cram et al. |
| 5,966,695 | A | 10/1999 | Melchione et al. |
| 5,966,699 | A | 10/1999 | Zandi |
| 5,967,896 | A | 10/1999 | Jorasch et al. |
| 5,969,318 | A | 10/1999 | Mackenthun |
| 5,970,143 | A | 10/1999 | Schneier et al. |
| 5,970,470 | A | 10/1999 | Walker et al. |
| 5,970,478 | A | 10/1999 | Walker et al. |
| 5,970,482 | A | 10/1999 | Pham |
| 5,970,483 | A | 10/1999 | Evans |
| 5,978,467 | A | 11/1999 | Walker et al. |
| 5,983,196 | A | 11/1999 | Wendkos |
| 5,987,434 | A | 11/1999 | Libman |
| 5,987,454 | A | 11/1999 | Hobbs |
| 5,987,498 | A | 11/1999 | Athing et al. |
| 5,991,736 | A | 11/1999 | Ferguson et al. |
| 5,991,738 | A | 11/1999 | Ogram |
| 5,991,748 | A | 11/1999 | Taskett |
| 5,991,751 | A | 11/1999 | Rivette et al. |
| 5,991,780 | A | 11/1999 | Rivette |
| 5,995,948 | A | 11/1999 | Whitford |
| 5,995,976 | A | 11/1999 | Walker et al. |
| 5,999,596 | A | 12/1999 | Walker et al. |
| 5,999,907 | A | 12/1999 | Donner |
| 6,000,033 | A | 12/1999 | Kelly et al. |
| 6,001,016 | A | 12/1999 | Walker et al. |
| 6,003,762 | A | 12/1999 | Hayashida |
| 6,005,939 | A | 12/1999 | Fortenberry et al. |
| 6,006,205 | A | 12/1999 | Loeb et al. |
| 6,006,249 | A | 12/1999 | Leong |
| 6,009,415 | A | 12/1999 | Shurling et al. |
| 6,009,442 | A | 12/1999 | Chen et al. |
| 6,010,404 | A | 1/2000 | Walker et al. |
| 6,012,088 | A | 1/2000 | Li et al. |
| 6,012,983 | A | 1/2000 | Walker et al. |
| 6,014,439 | A | 1/2000 | Walker et al. |
| 6,014,635 | A | 1/2000 | Harris et al. |
| 6,014,636 | A | 1/2000 | Reeder |
| 6,014,638 | A | 1/2000 | Burge et al. |
| 6,014,641 | A | 1/2000 | Loeb et al. |
| 6,014,645 | A | 1/2000 | Cunningham |
| 6,016,810 | A | 1/2000 | Ravenscroft |
| 6,018,714 | A | 1/2000 | Risen, Jr. |
| 6,018,718 | A | 1/2000 | Walker et al. |
| 6,024,640 | A | 2/2000 | Walker et al. |
| 6,026,429 | A | 2/2000 | Jones et al. |
| 6,032,134 | A | 2/2000 | Weissman |
| 6,032,147 | A | 2/2000 | Williams et al. |
| 6,038,547 | A | 3/2000 | Casto |
| 6,038,552 | A | 3/2000 | Fleischl et al. |
| 6,041,357 | A * | 3/2000 | Kunzelman et al. ........ 709/228 |
| 6,041,383 | A * | 3/2000 | Jeffords et al. ........ 710/200 |
| 6,042,006 | A | 3/2000 | Van Tilburg et al. |
| 6,044,362 | A | 3/2000 | Neely |
| 6,045,039 | A | 4/2000 | Stinson et al. |
| 6,049,778 | A | 4/2000 | Walker et al. |
| 6,049,782 | A | 4/2000 | Gottesman et al. |
| 6,049,835 | A | 4/2000 | Gagnon |
| 6,055,637 | A | 4/2000 | Hudson et al. |
| 6,061,665 | A | 5/2000 | Bahreman |
| 6,064,987 | A | 5/2000 | Walker et al. |
| 6,065,120 | A | 5/2000 | Laursen et al. |
| 6,065,675 | A | 5/2000 | Teicher |
| 6,070,147 | A | 5/2000 | Harms et al. |
| 6,070,153 | A | 5/2000 | Simpson |
| 6,070,244 | A | 5/2000 | Orchier et al. |
| 6,073,105 | A | 6/2000 | Sutcliffe et al. |
| 6,073,113 | A | 6/2000 | Guinan |
| 6,075,519 | A | 6/2000 | Okatani et al. |
| 6,076,072 | A | 6/2000 | Libman |
| 6,081,790 | A | 6/2000 | Rosen |
| 6,081,810 | A | 6/2000 | Rosenzweig et al. |
| 6,085,168 | A | 7/2000 | Mori et al. |
| 6,088,444 | A | 7/2000 | Walker et al. |
| 6,088,451 | A | 7/2000 | He et al. |
| 6,088,683 | A | 7/2000 | Jalili |
| 6,088,686 | A | 7/2000 | Walker et al. |
| 6,088,700 | A | 7/2000 | Larsen et al. |
| 6,091,817 | A | 7/2000 | Bertina et al. |
| 6,092,196 | A | 7/2000 | Reiche |
| 6,095,412 | A | 8/2000 | Bertina et al. |
| 6,098,070 | A | 8/2000 | Maxwell |
| 6,101,486 | A | 8/2000 | Roberts et al. |
| 6,104,716 | A | 8/2000 | Crichton et al. |
| 6,105,012 | A | 8/2000 | Chang et al. |
| 6,105,865 | A | 8/2000 | Hardesty |
| 6,111,858 | A | 8/2000 | Greaves et al. |
| 6,112,181 | A | 8/2000 | Shear et al. |
| 6,115,690 | A | 9/2000 | Wong |
| 6,119,093 | A | 9/2000 | Walker et al. |
| 6,119,099 | A | 9/2000 | Walker et al. |
| 6,128,599 | A | 10/2000 | Walker et al. |
| 6,128,602 | A | 10/2000 | Northington et al. |
| 6,131,810 | A | 10/2000 | Weiss et al. |
| 6,134,549 | A | 10/2000 | Regnier et al. |
| 6,134,592 | A | 10/2000 | Montulli |
| 6,135,349 | A | 10/2000 | Zirkel |
| 6,138,106 | A | 10/2000 | Walker et al. |
| 6,138,118 | A | 10/2000 | Koppstein et al. |
| 6,141,651 | A | 10/2000 | Riley et al. |
| 6,141,666 | A | 10/2000 | Tobin |
| 6,144,946 | A | 11/2000 | Iwamura |
| 6,144,948 | A | 11/2000 | Walker et al. |
| 6,145,086 | A | 11/2000 | Bellemore et al. |
| 6,148,293 | A | 11/2000 | King |
| 6,151,584 | A | 11/2000 | Papierniak et al. |
| 6,154,750 | A | 11/2000 | Roberge et al. |
| 6,154,879 | A | 11/2000 | Pare et al. |

| | | |
|---|---|---|
| 6,161,182 A | 12/2000 | Nadooshan |
| 6,164,533 A | 12/2000 | Barton |
| 6,170,011 B1 | 1/2001 | Beck et al. |
| 6,178,511 B1 | 1/2001 | Cohen et al. |
| 6,182,052 B1 | 1/2001 | Fulton et al. |
| 6,182,142 B1 * | 1/2001 | Win et al. ............... 709/229 |
| 6,182,225 B1 | 1/2001 | Hagiuda et al. |
| 6,185,242 B1 | 2/2001 | Arthur et al. |
| 6,189,029 B1 | 2/2001 | Fuerst |
| 6,195,644 B1 | 2/2001 | Bowie |
| 6,199,077 B1 | 3/2001 | Inala et al. |
| 6,201,948 B1 | 3/2001 | Cook et al. |
| 6,202,005 B1 | 3/2001 | Mahaffey |
| 6,202,054 B1 | 3/2001 | Lawlor et al. |
| 6,202,151 B1 | 3/2001 | Musgrave et al. |
| 6,205,480 B1 * | 3/2001 | Broadhurst et al. ........ 709/225 |
| 6,208,978 B1 | 3/2001 | Walker et al. |
| 6,208,984 B1 | 3/2001 | Rosenthal |
| 6,216,115 B1 | 4/2001 | Barrameda et al. |
| 6,219,706 B1 | 4/2001 | Fan |
| 6,222,914 B1 | 4/2001 | McMullin |
| 6,226,623 B1 | 5/2001 | Schein et al. |
| 6,226,679 B1 | 5/2001 | Gupta |
| 6,227,447 B1 | 5/2001 | Campisano |
| 6,230,148 B1 | 5/2001 | Pare et al. |
| 6,243,688 B1 | 6/2001 | Kalina |
| 6,243,816 B1 | 6/2001 | Fang et al. |
| 6,253,327 B1 | 6/2001 | Zhang et al. |
| 6,253,328 B1 | 6/2001 | Smith, Jr. |
| 6,260,026 B1 | 7/2001 | Tomida et al. |
| 6,266,648 B1 | 7/2001 | Baker, III |
| 6,266,683 B1 | 7/2001 | Yehuda et al. |
| 6,267,292 B1 | 7/2001 | Walker et al. |
| 6,269,348 B1 | 7/2001 | Pare et al. |
| 6,275,944 B1 | 8/2001 | Kao et al. |
| 6,289,322 B1 | 9/2001 | Kitchen et al. |
| 6,298,330 B1 | 10/2001 | Gardenswartz et al. |
| 6,298,356 B1 | 10/2001 | Jawahar et al. |
| 6,301,567 B1 | 10/2001 | Leong et al. |
| 6,308,273 B1 | 10/2001 | Goertzel et al. |
| 6,308,274 B1 | 10/2001 | Swift |
| 6,311,275 B1 | 10/2001 | Jin et al. |
| 6,317,838 B1 * | 11/2001 | Baize ...................... 713/201 |
| 6,324,524 B1 | 11/2001 | Lent et al. |
| 6,327,573 B1 | 12/2001 | Walker et al. |
| 6,327,578 B1 | 12/2001 | Linehan |
| 6,332,192 B1 | 12/2001 | Boroditsky et al. |
| 6,336,104 B1 | 1/2002 | Walker et al. |
| 6,343,279 B1 | 1/2002 | Bissonette et al. |
| 6,345,261 B1 | 2/2002 | Feidelson |
| 6,349,242 B2 | 2/2002 | Mahaffey |
| 6,349,336 B1 | 2/2002 | Sit et al. |
| 6,374,359 B1 * | 4/2002 | Shrader et al. ............. 713/201 |
| 6,385,591 B1 | 5/2002 | Mankoff |
| 6,385,652 B1 | 5/2002 | Brown et al. |
| 6,401,125 B1 * | 6/2002 | Makarios et al. .......... 709/229 |
| 6,401,211 B1 | 6/2002 | Brezak, Jr. et al. |
| 6,408,389 B2 | 6/2002 | Grawrock et al. |
| 6,418,457 B1 | 7/2002 | Schmidt et al. |
| 6,421,729 B1 * | 7/2002 | Paltenghe et al. .......... 709/229 |
| 6,421,768 B1 * | 7/2002 | Purpura ..................... 711/164 |
| 6,438,219 B1 * | 8/2002 | Karau et al. ............. 379/112.01 |
| 6,438,594 B1 | 8/2002 | Bowman-Amuah |
| 6,453,353 B1 | 9/2002 | Win et al. |
| 6,460,141 B1 | 10/2002 | Olden |
| 6,490,624 B1 * | 12/2002 | Sampson et al. ........... 709/227 |
| 6,493,677 B1 | 12/2002 | von Rosen et al. |
| 6,493,685 B1 | 12/2002 | Ensel et al. |
| 6,496,824 B1 * | 12/2002 | Wilf ........................ 707/10 |
| 6,496,855 B1 | 12/2002 | Hunt et al. |
| 6,496,936 B1 | 12/2002 | French et al. |
| 6,510,523 B1 | 1/2003 | Perlman et al. |
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar et al. |
| 6,557,039 B1 | 4/2003 | Leong et al. |
| 6,581,040 B1 | 6/2003 | Wright et al. |
| 6,584,505 B1 * | 6/2003 | Howard et al. ............. 709/225 |
| 6,584,508 B1 | 6/2003 | Epstein et al. |
| 6,609,113 B1 | 8/2003 | O'Leary et al. |
| 6,609,125 B1 | 8/2003 | Layne et al. |
| 6,609,198 B1 | 8/2003 | Wood et al. |
| 6,618,579 B1 | 9/2003 | Smith et al. |
| 6,618,806 B1 | 9/2003 | Brown et al. |
| 6,623,415 B2 | 9/2003 | Gates et al. |
| 6,687,222 B1 | 2/2004 | Albert et al. |
| 6,691,232 B1 * | 2/2004 | Wood et al. ................ 713/201 |
| 6,718,482 B2 | 4/2004 | Sato et al. |
| 6,725,252 B1 * | 4/2004 | Himmel et al. ............. 709/203 |
| 6,725,269 B1 | 4/2004 | Megiddo |
| 6,751,654 B2 | 6/2004 | Massarani et al. |
| 6,754,833 B1 | 6/2004 | Black et al. |
| 6,766,370 B2 | 7/2004 | Glommen et al. |
| 6,772,146 B2 | 8/2004 | Khemlani et al. |
| 6,820,202 B1 | 11/2004 | Wheeler et al. |
| 6,826,696 B1 * | 11/2004 | Chawla et al. .............. 713/201 |
| 6,832,202 B1 | 12/2004 | Schuyler et al. |
| 6,848,000 B1 * | 1/2005 | Reynolds ................... 709/226 |
| 6,856,970 B1 | 2/2005 | Campbell et al. |
| 6,892,231 B2 | 5/2005 | Jager |
| 6,907,566 B1 | 6/2005 | McElfresh et al. |
| 6,938,158 B2 * | 8/2005 | Azuma ..................... 713/182 |
| 6,965,939 B2 * | 11/2005 | Cuomo et al. .............. 709/229 |
| 6,976,164 B1 * | 12/2005 | King et al. ................. 713/156 |
| 7,089,585 B1 * | 8/2006 | Dharmarajan ................ 726/8 |
| 7,093,020 B1 * | 8/2006 | McCarty et al. ............ 709/229 |
| 7,137,006 B1 * | 11/2006 | Grandcolas et al. ........ 713/180 |
| 2001/0012974 A1 | 8/2001 | Mahaffey |
| 2001/0032184 A1 | 10/2001 | Tenembaum |
| 2001/0047295 A1 | 11/2001 | Tenembaum |
| 2001/0051917 A1 | 12/2001 | Bissonette et al. |
| 2001/0054003 A1 | 12/2001 | Chien et al. |
| 2002/0007313 A1 | 1/2002 | Mai et al. |
| 2002/0007460 A1 | 1/2002 | Azuma |
| 2002/0010599 A1 | 1/2002 | Levison |
| 2002/0010668 A1 | 1/2002 | Travis et al. |
| 2002/0018585 A1 | 2/2002 | Kim |
| 2002/0019938 A1 | 2/2002 | Aarons |
| 2002/0032613 A1 | 3/2002 | Buettgenbach et al. |
| 2002/0032650 A1 | 3/2002 | Hauser et al. |
| 2002/0059141 A1 | 5/2002 | Davies et al. |
| 2002/0077978 A1 | 6/2002 | O'Leary et al. |
| 2002/0099826 A1 | 7/2002 | Summers et al. |
| 2002/0104006 A1 | 8/2002 | Boate et al. |
| 2002/0104017 A1 | 8/2002 | Stefan |
| 2002/0107788 A1 | 8/2002 | Cunningham |
| 2002/0152163 A1 | 10/2002 | Bezos et al. |
| 2002/0165949 A1 | 11/2002 | Na |
| 2002/0174010 A1 | 11/2002 | Rice, III |
| 2002/0184507 A1 | 12/2002 | Makower et al. |
| 2002/0188869 A1 | 12/2002 | Patrick |
| 2002/0191548 A1 | 12/2002 | Ylonen et al. |
| 2003/0018915 A1 | 1/2003 | Stoll |
| 2003/0023880 A1 | 1/2003 | Edwards et al. |
| 2003/0034388 A1 | 2/2003 | Routhenstein et al. |
| 2003/0037142 A1 | 2/2003 | Munger et al. |
| 2003/0046587 A1 | 3/2003 | Bheemarasetti et al. |
| 2003/0046589 A1 | 3/2003 | Gregg |
| 2003/0051026 A1 | 3/2003 | Carter et al. |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0084345 A1 | 5/2003 | Bjornestad et al. |
| 2003/0084647 A1 | 5/2003 | Smith et al. |
| 2003/0088552 A1 | 5/2003 | Bennett et al. |
| 2003/0105981 A1 | 6/2003 | Miller et al. |
| 2003/0110399 A1 | 6/2003 | Rail |
| 2003/0115160 A1 | 6/2003 | Nowlin et al. |
| 2003/0119642 A1 | 6/2003 | Gates et al. |
| 2003/0154403 A1 | 8/2003 | Keinsley et al. |
| 2003/0159072 A1 | 8/2003 | Bellinger et al. |
| 2003/0163733 A1 | 8/2003 | Barriga-Caceres et al. |
| 2003/0177067 A1 | 9/2003 | Cowell et al. |
| 2003/0191549 A1 | 10/2003 | Otsuka et al. |
| 2004/0031856 A1 | 2/2004 | Atsmon et al. |
| 2005/0080747 A1 | 4/2005 | Anderson et al. |

| | | |
|---|---|---|
| 2005/0082362 A1 | 4/2005 | Anderson et al. |
| 2005/0086160 A1 | 4/2005 | Wong et al. |
| 2005/0086177 A1 | 4/2005 | Anderson et al. |

FOREIGN PATENT DOCUMENTS

| | | |
|---|---|---|
| EP | 1022664 | 7/2000 |
| WO | WO 99/40507 A1 | 8/1999 |
| WO | WO 99/52051 | 10/1999 |
| WO | WO 00/68858 | 11/2000 |
| WO | WO 01/18656 A1 | 3/2001 |
| WO | WO 01/35355 | 5/2001 |
| WO | WO 01/43084 | 6/2001 |
| WO | WO 01/88659 | 11/2001 |
| WO | WO 02/17082 A1 | 2/2002 |

OTHER PUBLICATIONS

Epper, A Player Goes After Big Bucks in Cyberspace, American Banker, vol. 160, No. 86, ISSN: 0002-7561, May 5, 1995, p. 17.
Berry et al., A Potent New Tool for Selling Database, Business Week, Sep. 5, 1994, pp. 56-62.
Network Computing—The new face of single sign on, Mar. 22, 1999, Carden.
Applets, java.sun.com, May 21, 1999.
Associates National Bank (DE) Credit Card, The Associates, www.theassociates.com/consumer/credit_cards/main.html, Apr. 6, 1999, 6 pages.
At Your Request, www.wingspanbank.com, Sep. 28, 1999.
Anonymous, Aversion Therapy: Banks Overcoming Fear of the 'Net to Develop Safe Internet-based Payment System w/ Netscape Communicator, Network World, ISSN: 0887-7661, Dec. 12, 1994.
JAVA, Banking on JAVA(TM) Technology, java.sun.com, May 21, 1999.
Bechtel Construction Operations Incorporated Standardizes on Primavera's Expedition Contract Management Software, Business Wire, Jul. 27, 1999.
Anonymous, CORBA Overview, arch2.htm at pent21.infosys.tuwien.ac.at, May 25, 1999.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Bank, Cash, Check,Charge—What's Next?, Seattle Times, Mar. 6, 1995.
Consortium Created to Manage Common Electronic Purse Specifications, http://www.visa.com/av/news/PRmisc051199.vhtml, printed Feb. 23, 2001.
Civitello Jr., Construction Operations Manual of Policies and Procedures, Third Edition, 2000.
Marchman, Construction Scheduling with Primavera Project Planner, May 25, 1999.
Chester, Cross-platform integration with XML and SOAP, IT PTO Sep. 10, 2001.
Mitchell, Cyberspace: Crafting Software . . . , Business Week, Feb. 27, 1999, pp. 78-86.
Friedman, Dictionary of Business Terms, Barron's Third Edition, Copyright 2000.
Strassel, Dutch Software Concern Experiments with Electronic 'Cash' in Cyberspace, The Wall Street Journal, Apr. 17, 1995.
Post, E-Cash: Can't Live With It, Can't Live Without It, The American Lawyer, Mar. 1, 1995, pp. 116-117.
Thomas, Enterprise JAVABEANS(TM) Technology: Server Component Model for the Java(TM) platform, java.sun.com, May 2, 1999.
Maize, Fannie Mae on the Web, Doucment ID: 52079, May 8, 1995.
FreeMarkets, printed on Apr. 26, 1999.
The Gale Group, G&D America's Multi-application Smart Card Selected for Combined Payroll and 'Virtual Banking' Program in Mexico, Business Wire, Apr. 24, 1998, p. 241047.
Getting Smart with Java: Sun Micro Says American Express to Use Java for Smart Card, ABCNews.com, printed on Jun. 6, 2000.
Getting Started: Specific GE TPN Post Service Use Guidelines, printed on Apr. 26, 1999.
Harris, Harris InfoSource, printed on Apr. 26, 1999.
Knowles, Improved Internet Security Enabling On-Line Commerce, PCWeek, vol. 12, No. 11, ISSN: 0740-1604, Mar. 20, 1995.
Meredith, Internet bank moves closer to virtual reality, USA Today, May 5, 1995.
JAVA, JAVA (TM) Technology in the Real World, java.sun.com, May 21, 1999.
JAVE, JAVA(TM) Remote Method Invocation (RMI) Interface, java.sun.com, 05/32/1999.
JAVA, JAVA(TM) Servlet API, java.sun.com, May 21, 1999.
OMG, Library, www.omg.com, May 25, 1999.
Method of Protecting Data on a Personal Computer, IBM Corporation, TDB 11-85, Order 85A 62426, Nov. 1, 1995, p. 2530.
Clark, Microsoft, Visa to Jointly Develop PC Electronic-Shopping Software, The Wall Street Journal, Nov. 9, 1994, WSJ B9.
Sirbu, et al, NetBill: An Internet Commerce System Optimized for Network Delivered Services, printed on Feb. 27, 1995.
Mitchell, Netlink Goes After An Unbanked Niche, Card Technology, ISSN: 1093-1279, Sep. 1999, p. 22.
Barnham, Network Brings Together Producers and Companies, Document ID: 17347.
Houlder, OFT Gives the Individual Top Priority: Report Calls for Deregulation of Business Lending, Document ID: 91716, Jun. 8, 1994.
Anonymous, Overview of CORBA, May 25, 1999.
Harris, Planning Using Primavera Project Planner P3 Version 3.0, User Guide, Copyright 1999 by Eastwood Harry Pty Ltd., 1999.
Johnston, Pondering Passport: Do You Trust Microsoft With Your Data?, www.pcworld.com/resource/printable/article/0.aid,63244,00.asp, Sep. 24, 2001.
Primavera Systems, Inc.—How the World Manages Projects, Expedition Contract Control Software, www.primavera.com, Jun. 23, 2005.
Primavera and PurchasePro.com to Create E-Commerce Marketplace for Construction Industry, Primavera Ships P3, version 3.0, www.purchasepro.com/, Sep. 21, 1999, pp. 1-3.
Product Data Integration Technologies, Inc., Step Integratin Authors, printed on Apr. 26, 1999.
Resource Center: Consolidated Edison Selects GE TPN Post, printed Apr. 26, 1999.
Kormann, Risks of the Passport Single Signon Protocol, Computer Networks, Elsevier Science Press, vol. 33, Sep. 20, 2003, pp. 51-58.
SBA: Pro-Net, U.S. Small Business Administration Procurement Marketing and Access Network, Last Modified: Apr. 1, 1999.
Jepsen, Soap Cleans up interoperability problems on the web, IT PTO, Jan./Feb. 2001.
Safe Single-Sign-On Protocol with Minimal Password Exposure No Decryption and Technology Adaptivity, IBM Corporation, TDB 03-95, Order 95A, Mar. 1, 1995, pp. 245-248.
Sun Microsystems, Inc., Schema for Representing CORBA Objects in an LDAP directory, May 21, 1999, pp. 1-9.
Jakobsson et al., Secure and lightweight advertising on the web, Computer Networks, 31 (1999) 1101-1109.
Servlet/Applet/HTML Authentication Process with Single Sign-On, IBM Corporation, IBM Order: 00A6004, Jan. 1, 2000.
Shibata, Seventh International Conference on Parallel and Distributed Systems: Workshops, IEEE Computer Society, Jul. 4-7, 2000.
Siebel, Siebel: Ensuring Customer Success, www.siebel.com, Nov. 17, 1999.
SmartAxis, How it works, http://www.smartaxis.co.uk/seller/howitworks.html, printed on Feb. 23, 2001.
Thomas Publishing Company, SoluSource: For Engineers by Engineers, Thomas Publishing Company, Apr. 26, 1999.
JAVA, Staying in Touch with JNDI, java.sun.com, May 21, 1999.
Summary of the at Your Request Architecture, First USA Bank Confidential and Proprietary, Apr. 2, 1999, pp. 1-8.
Temporary Global Passwords, IBM Corporation, IBM TDB v36, n3, 03-93, Order 93A 60636, Mar. 1, 1993, pp. 451-454.
JAVA, The JDBC(TM) Data Access API, java.sun com, May 21, 1999.
The check is in the email, Information Today, vol. 12, No. 3, ISSN: 8755-6286, 03/01995.
Thomas Publishing Company, ThomasNet, Apr. 26, 1999.
Ritz, Total Construction Project Management, McGraw-Hill, 1994.
Hewlett-Packard Company, Understanding Product Data Management, Hewlett-Packard Company.

Welcome to MUSE, Apr. 26, 1999.
OMG, Welcome to OMG's CORBA for Beginners Pagel, www.omg.co, May 25, 1999.
OMG, What is CORBA?, www.omg.com, May 25, 1999.
Fujimura et al., XML Voucher: Generic Voucher Language, Feb. 2003.
eCharge, eCharge Corporation, www.echarge.com, Dec. 3, 1999.
Radosevich, "Is Work Flow Working?", CNN.com, Apr. 6, 1999 at <http://www.cnn.com/TECH/computing/9904/06/workflow/ent.idg, p. 1 of 5, retrieved from the internet on Nov. 28, 2005.

"Construction Financing to Build Your Own Home", ISBN: 0962864307, Jul. 1990.
Marlin, "Chasing Document Management", Inform, vol. 13, No. 4, p. 76-82, Apr. 1999.
Omware, Inc., Web Pages, Feb. 2000, Retrieved from http://web.archive.org/web20000226033405/www.omware.com/products.html, Retrieved from the Interneet on Nov. 28, 2005.

* cited by examiner

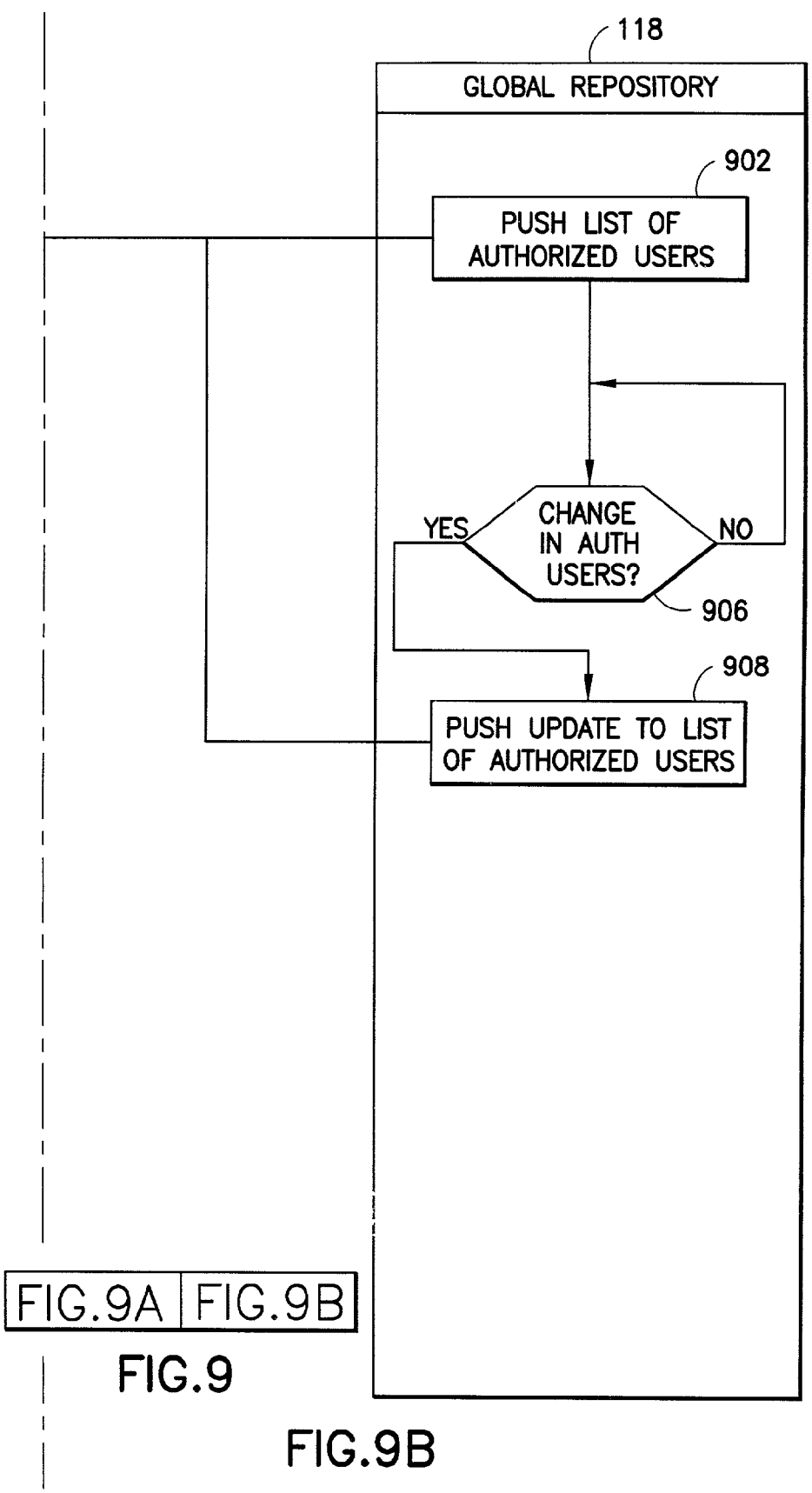

SYSTEM AND METHOD FOR SINGLE SIGN-ON SESSION MANAGEMENT WITHOUT CENTRAL SERVER

BACKGROUND

1. Field of the Invention

The present invention relates to session management, and more particularly to single sign-on session management across multiple servers without requiring a central session management server.

2. Description of the Related Art

As known in the field of electronic information access, it is common for protected resources on a server to require some form of authentication or certification before the protected resources are provided to a client user. As an example, the client user at a computer with a browser application, such as INTERNET EXPLORER or NETSCAPE, connects to the server over the Internet and attempts to access, down-load or view a protected resource. Before allowing access to the protected resource, the server must verify that the client user is allowed access to the protected resource. This may take the form of validating the user's credentials against a list of authorized users through a log-in process. Once the user is authenticated through the log-in process, the user is granted credentials and a session between the client and the server is established. It is common for a client user to want access to protected resources on multiple servers. Unless there is some form of sharing or communication between the servers, the client user must log-in to each of the servers. This is not particularly advantageous, and to overcome these disadvantages, single sign-on session management servers have been developed and fielded. Examples of these types of session management systems are the system provided by ENTRUST, of Plano Tex., called GETACCESS, and the system provided by NETEGRITY of Waltham Mass., called NETEGRITY SITEMINDER. It is common with these types of single sign-on session management systems to use a central session management server, connected to the protected resource servers. In some configurations, central session management is hosted on a single server. In other configurations, a number of servers host the central session management, with the individual servers inter-connected and acting as a single logical server. A single logical server requires an exchange of information between the individual servers to maintain a consistent data set.

The central session management server validates the session credentials of client users. This system architecture allows a single sign-on and shared use of the session credentials. However, a central session management server is a potential single point for managing and controlling all sessions in the system and is therefore vulnerable as a single point of failure. A central session management server can also limit network performance for session updates. As a network scales, there are more applications in the single sign-on environment and more traffic to and from the session manager. Therefore, in addition to being a single point of failure, this type of architecture with a central session management server can impose additional network traffic loads. The additional network traffic loads can have a significant effect when session management is distributed over a wide area network, where bandwidth tends to be more restricted than over a local area network.

One of the reasons that systems use a central session management server is to provide a central location to check for session invalidity. This requires a check for credential invalidity each time a client accesses a server application. However, session invalidity is a very rare event. Therefore, checking for credential validity creates a significant volume of overhead to detect a rare event.

What is needed is a system and method that provides single session sign-on without requiring a central session management server, without providing a single point of failure, or without the associated network traffic load.

The preceding description is not to be construed as an admission that any of the description is prior art relative to the present invention.

SUMMARY OF THE INVENTION

In one embodiment, the invention provides a method and system for single sign-on session management by establishing a session credential, validating the session credential at a first server, granting access to a first protected resource of the first server, validating the session credential at a second server, and granting access to a second protected resource of the second server. In this embodiment, communication with a third server is not required to validate the session credential at either the first server or the second server.

In one embodiment, the invention provides a method and system for single sign-on session management by providing a list of authorized users to a first server and to a second server, establishing a session credential using the list of authorized users, validating the session credential at the first server, validating the session credential at a second server, providing an update to the list of authorized users to the first server and to the second server, and changing the session credential based on the update to the list. Communication with a third server is not required to validate the session credential at either the first server or the second server.

In one embodiment, the invention provides a system for single sign-on session management comprising a first server with a first resource, a session management plug-in running on the first server, a second server with a second resource, a session management plug-in running on the second server, a first network providing a connection of the second server to the first server, and a client with a session credential, the client connectable to the first server and to the second server by the first network. The first server validates the session credential using the session management plug-in running on the first server without requiring a connection to either the second server or any other server and the second server validates the session credential using the session management plug-in running on the second server without requiring a connection to either the first server or any other server.

The foregoing specific aspects of the invention are illustrative of those which can be achieved by the present invention and are not intended to be exhaustive or limiting of the possible aspects or advantages that can be realized. Thus, the aspects of this invention will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

Figure 1:
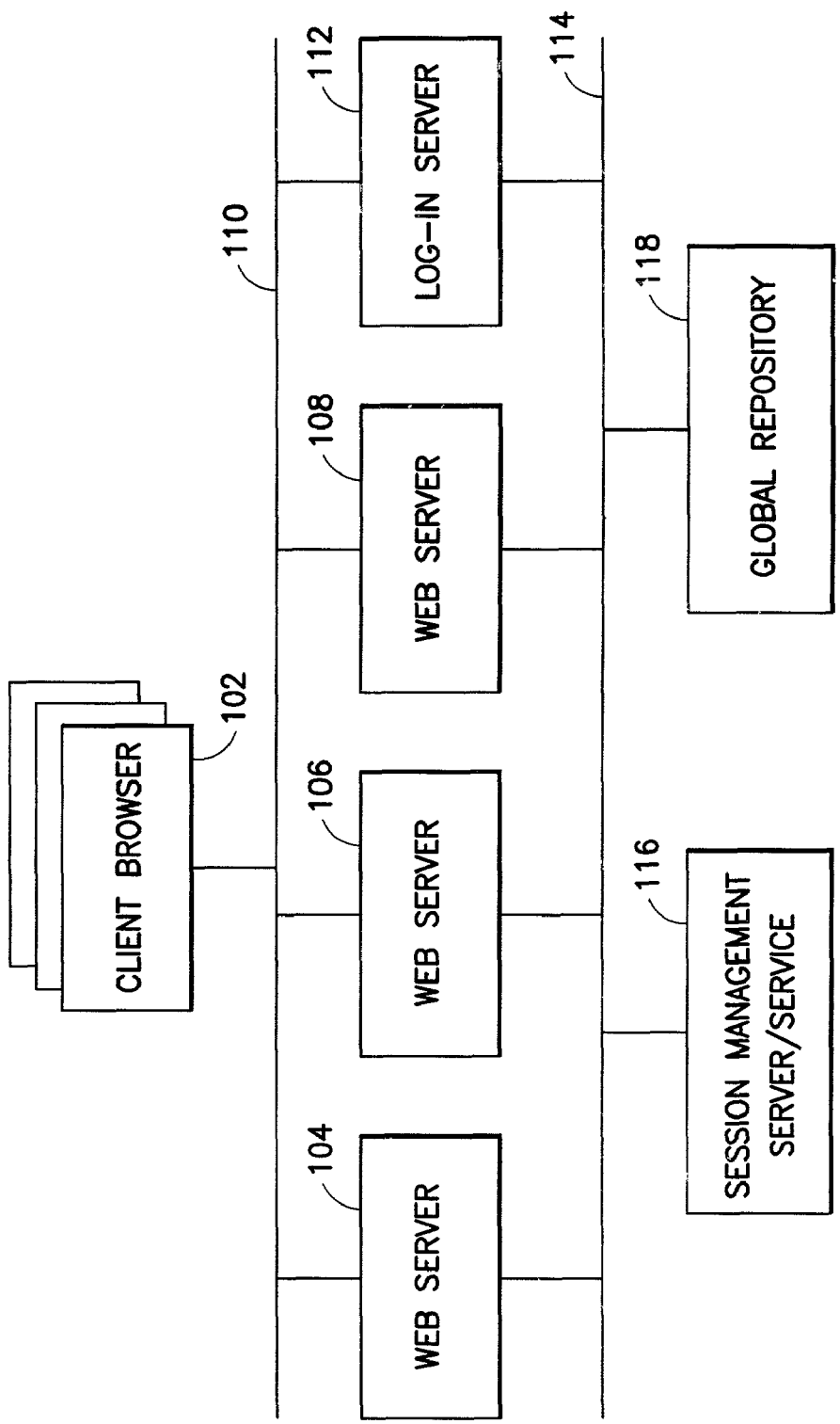
FIG. 1 illustrates a prior art system.

In order to understand the various embodiments of the methods and systems of the instant invention, it is helpful to understand existing systems and methods. Referring to FIG. 1, client users 102 running browser applications on their computers are connected to various servers 104, 106, 108 by a network 110, which can be the Internet over a wired or wireless transport. Also connected to network 110 is a log-in server 112. Network 110 is typically a public network or intranet. Connecting servers 104, 106, 108, 112 is another network 114, which is typically a private network, not directly available to client users 102. Alternatively network 114 is part of network 110. Networks 110, 114 typically provide or require appropriate security protection, and they may be local area networks (LAN), wide area networks (WAN) or a combination of both. Network 114 provides an interconnection between servers 104, 106, 108, log-in server 112, session management server 116 and global repository 118.

Figures 2, 2A:
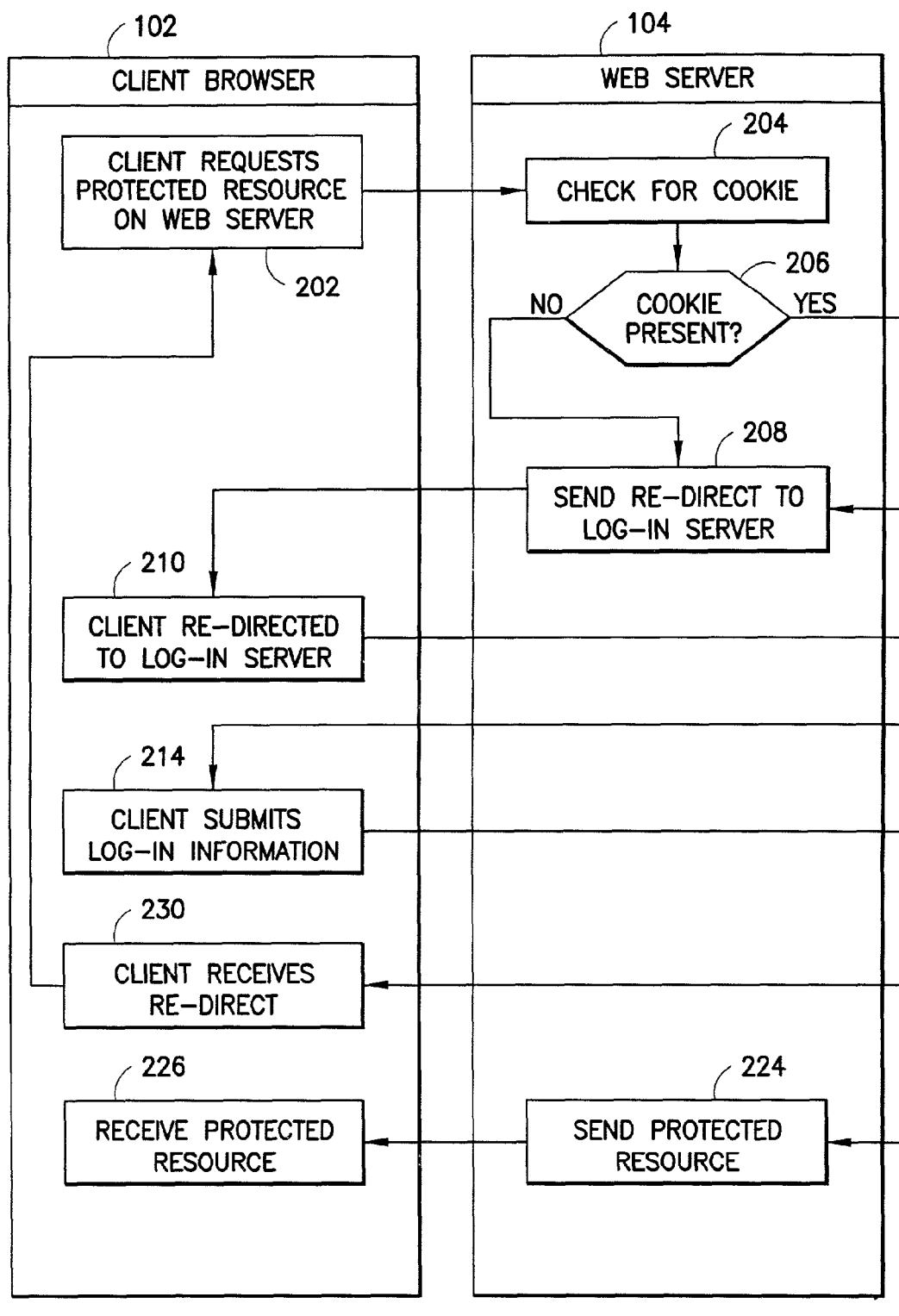
FIG. 2 illustrates a prior art method.
Figure 2B:
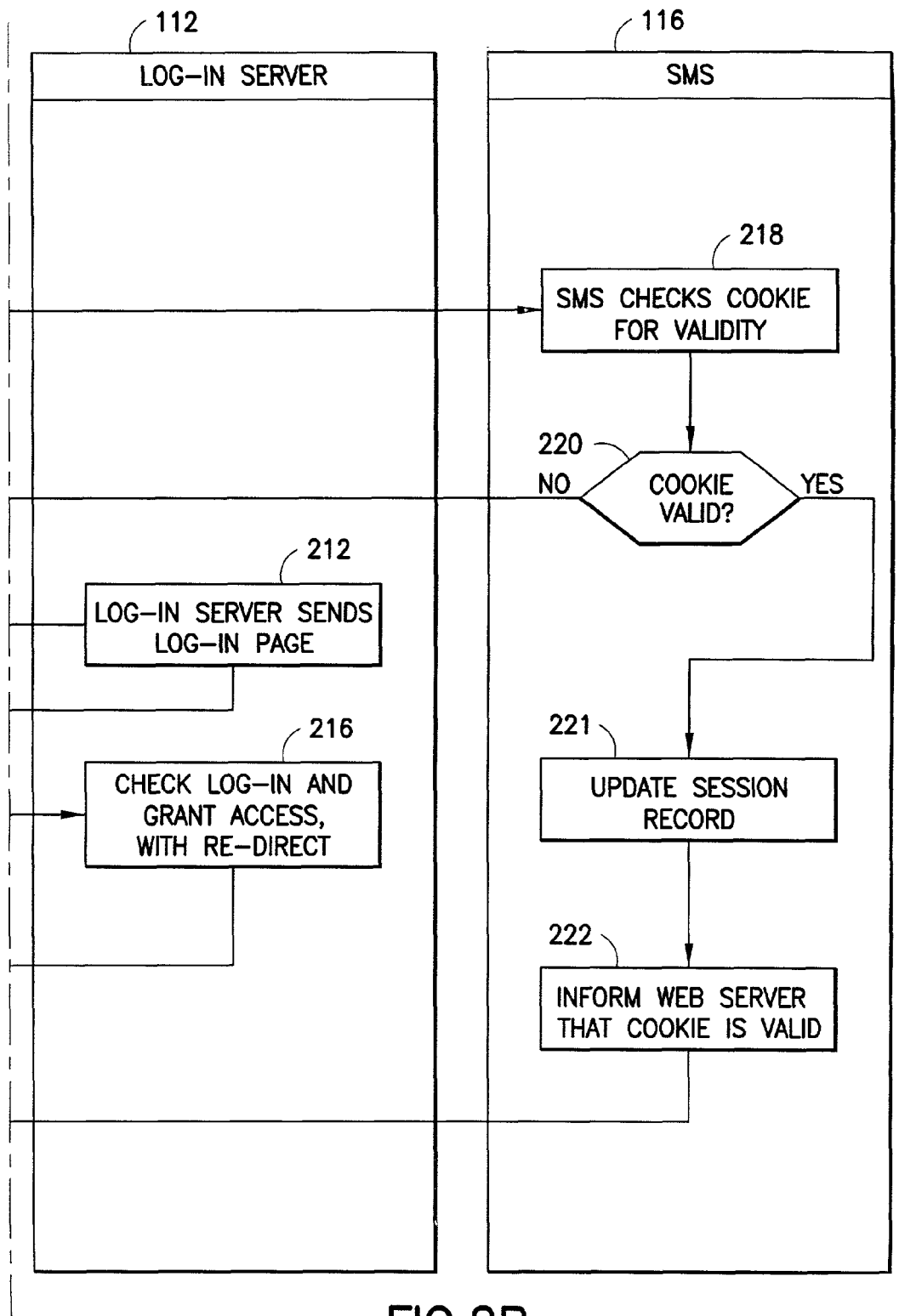

Referring to FIGS. 1 and 2, at step 202, a client user 102 with a browser application running on their computer requests a protected resource on server 104.

At steps 204, 206, server 104 checks to see if the request includes a cookie or token.

If there is no cookie present, then at steps 208, 210, client 102 is redirected to log-in server 112.

At steps 212, 214, log-in server 112 sends a log-in page to client 102 and client 102 provides log-in information.

At step 216, log-in server 112 checks the log-in information provided by the client user against a master list and grants access by issuing a credential to the user if the log-in information for the client user is correct. Although not illustrated, if the log-in information is not correct the client may be given other opportunities to provide the correct log-in information before possibly being locked out of the system.

The credential that log-in server 112 grants to the user is typically in the form of a token or cookie that is sent to the client browser application. Once the client user 102 has received the credential in the form of the cookie, every time they want access to a protected resource on server 104, the client user sends that cookie with the request to server 104.

On the re-direct at step 230, now that the client user has received a credential at step 216, the browser is redirected back to server 104. However, this time, when server 104 checks for a cookie at steps 204, 206, (the cookie containing the client credential) the cookie is found and the cookie or part of the cookie is sent to session management server 116 (SMS) to check for validity.

It is understood that some companies use the term SMS to refer to proprietary systems or services. However, here the term SMS refers generically to a session management server, without limit to any particular brand or company.

At steps 218, 220, SMS 116 checks for validity of the credential contained within the cookie. If the credential information is valid, then at step 221, SMS 116 updates the session record of client user 102 and then at step 222, SMS 116 informs server 104, which sends the protected resource to client user 102 at step 224. Client user 102 receives the requested protected resource at step 226.

It is possible that a cookie is present with the initial request for a protected resource, as determined at steps 204, 206, but the credential information is either not valid or is not correct, as determined at steps 218, 220. In this case, at step 208, client user 102 is redirected to log-in server 112, where the previously described log-in steps 210 through 216 are performed.

There are a number of reasons that credential information contained within the cookie may be invalid, such as expiration of a session time-out value or activity time-out value.

Figure 3:
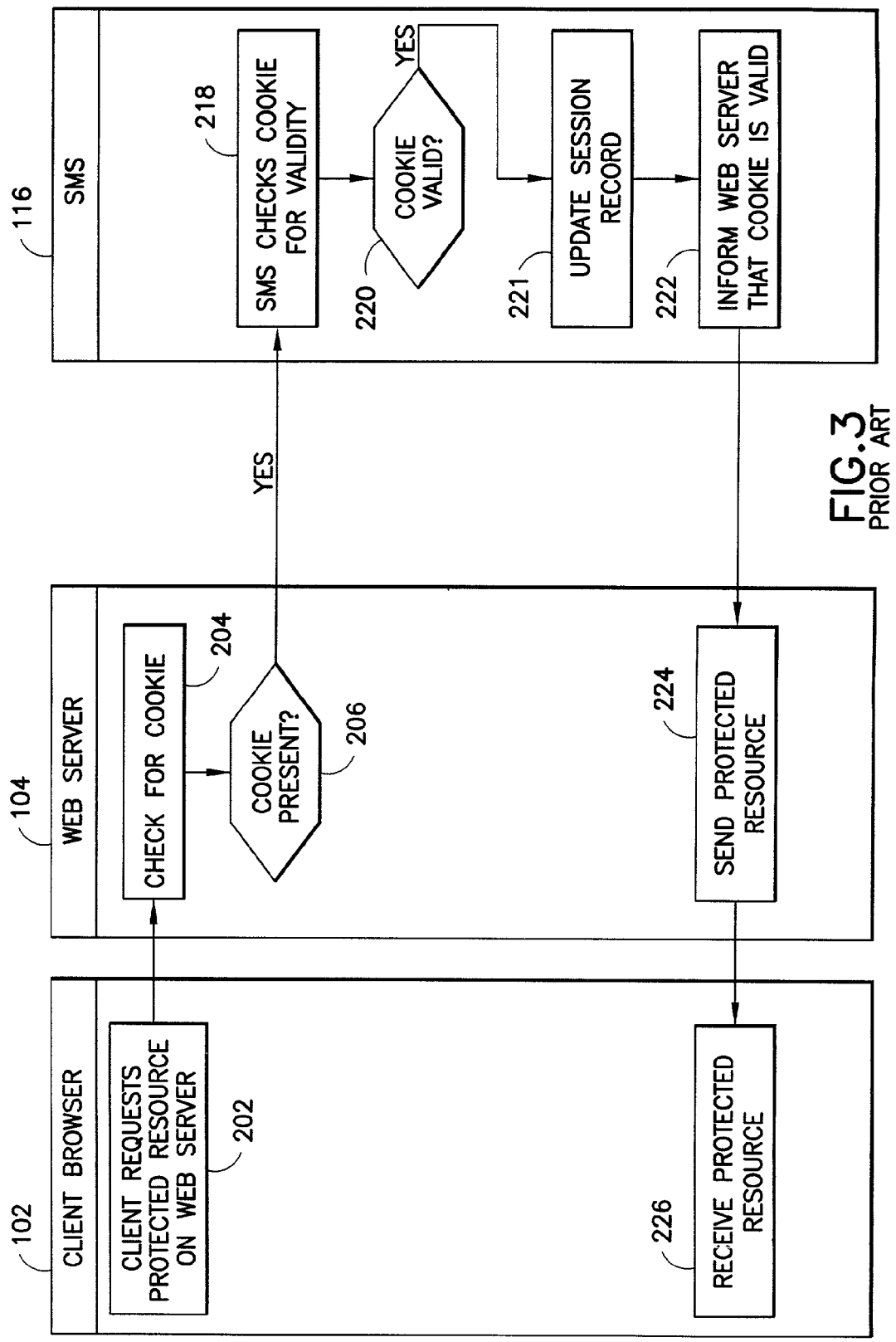
FIG. 3 illustrates a prior art method.

To simplify somewhat, FIG. 3, illustrates only some of the steps that are included in FIG. 2. Referring now to FIGS. 1 and 3, it is clear that even after client user 102 has successfully logged in, for every request of a protected resource on server 104, there is first a check for a cookie at steps 204, 206, and then the cookie, or information from the cookie is sent over network 114 to SMS 116, which validates the credential information at steps 218, 220 before updating the session record of client user 102 at step 221 and informing server 104, at step 222 that the credentials are valid, and server 104 provides the protected resource at steps 224, 226. Validation of the credentials thereby occurs before server 104 sends the protected resource to client user 102 at step 226. In one embodiment, the instant invention avoids the need for communication between server 104 and SMS 116 over network 114, while allowing maintenance of session state information.

Figure 4:
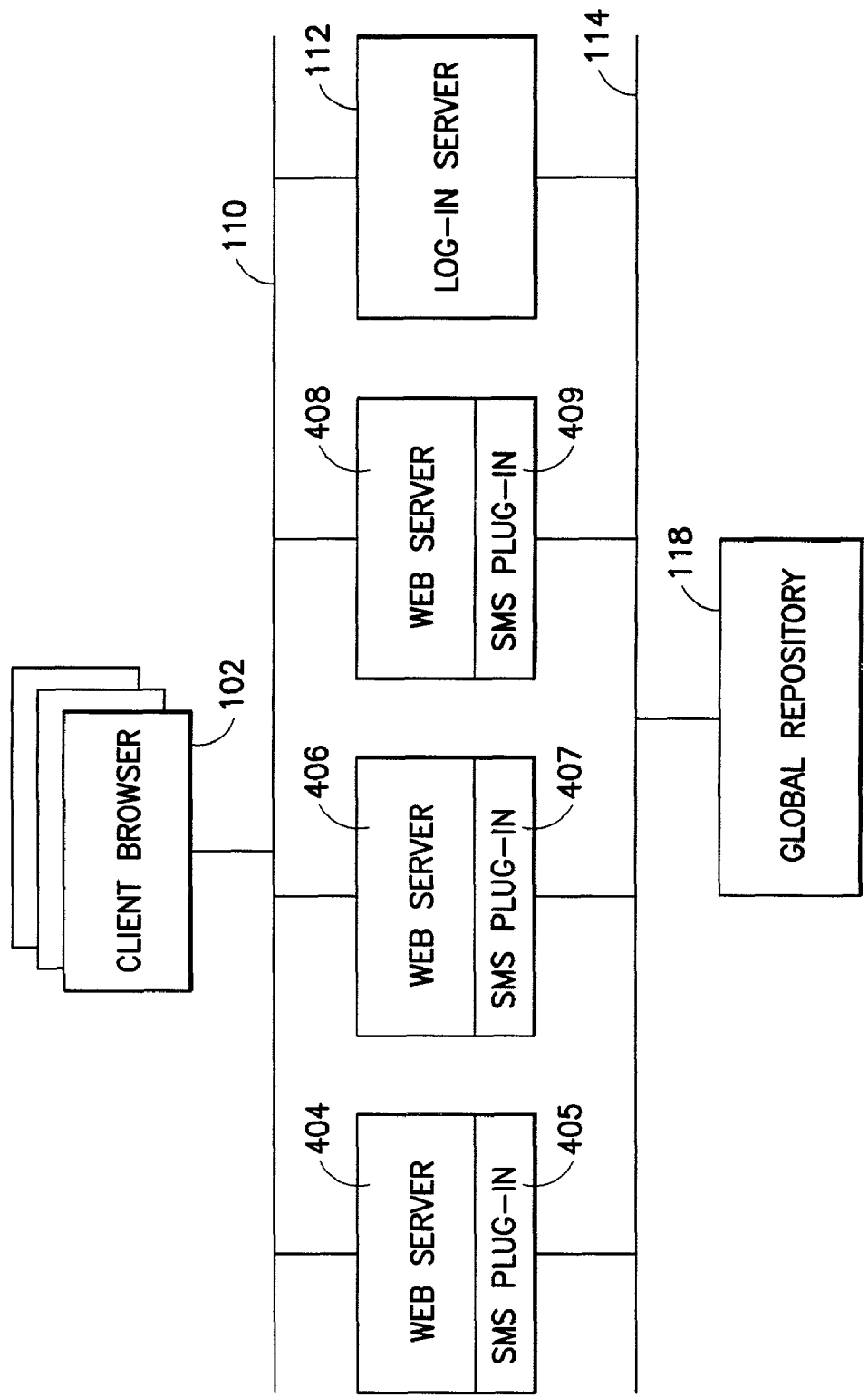
FIG. 4 illustrates an embodiment of a system according to the invention.

Referring now to FIG. 4, one embodiment of the invention is illustrated. Client user 102, with a browser application on their computer, is connected to servers 404, 406, 408 and log-in server 112 by network 110. Servers 404, 406, 408 and log-in server 112 are inter-connected with global repository 118 by network 114.

Servers 404, 406, 408 each run a respective instance of a session management service (SMS) plug-in 405, 407, 409.

Figure 5A:
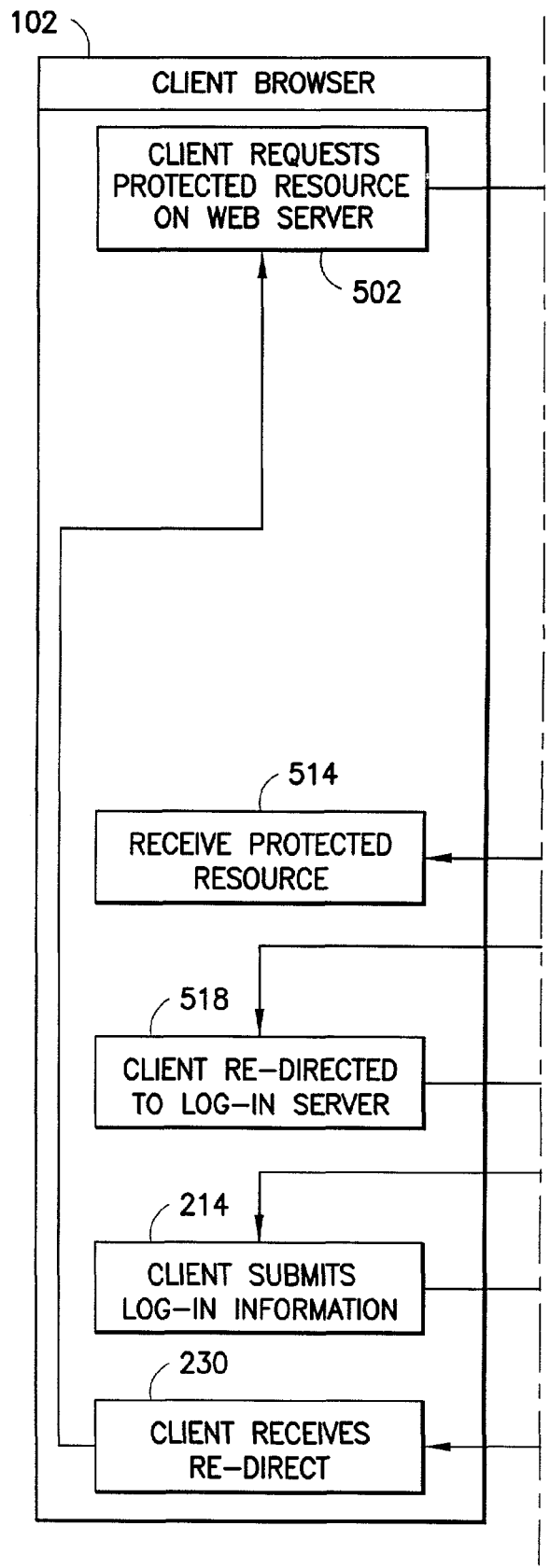
FIG. 5 illustrates an embodiment of a method according to the invention.
Figure 5B:
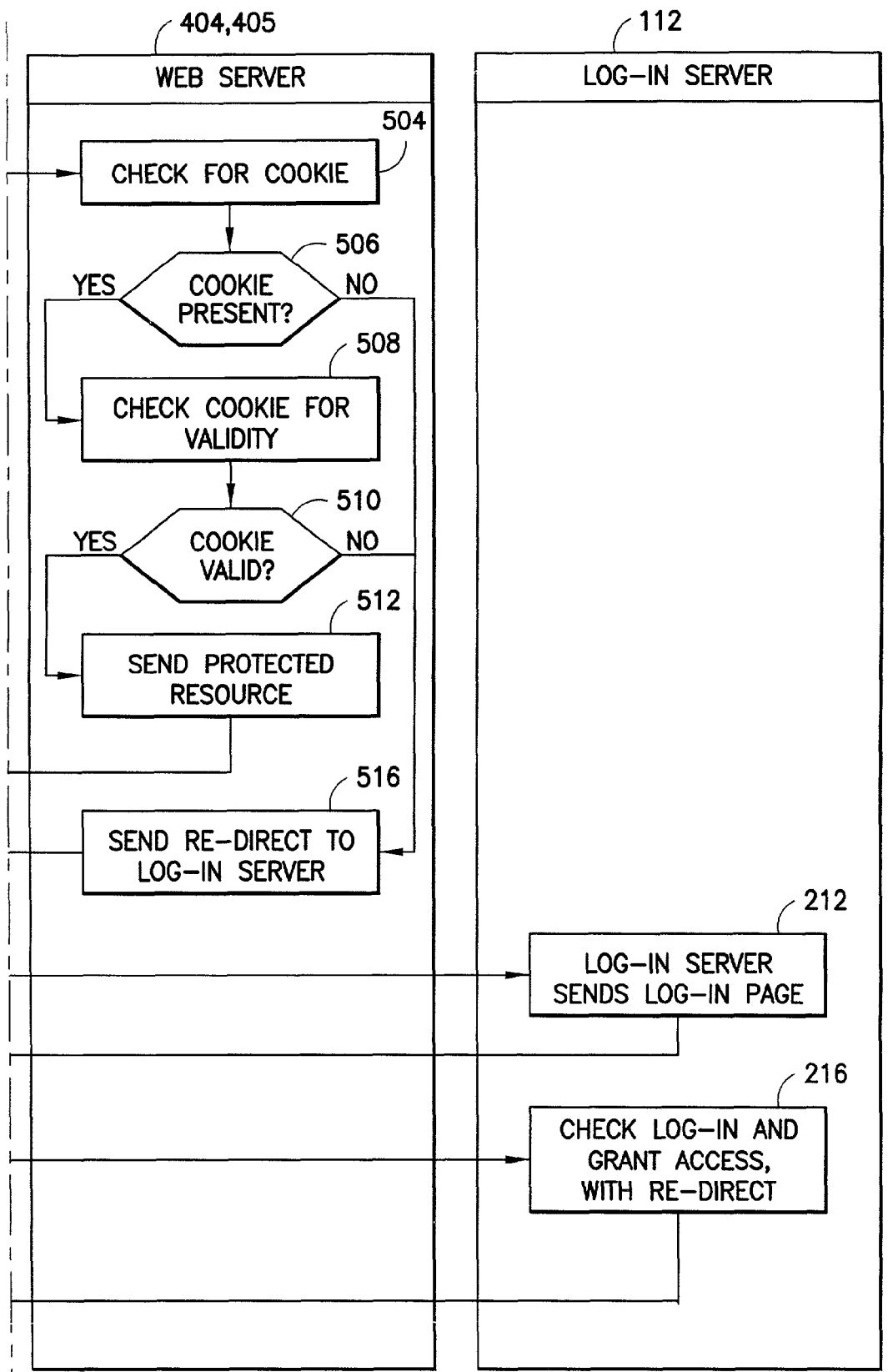

Referring to FIGS. 4 and 5, in one embodiment, at step 502, client user 102 requests a protected resource on server 404.

At steps 504, 506, server 404 checks for a cookie in the request.

If a cookie is present in the request, then at steps 508, 510, server 404 checks to see if the cookie is valid, and if valid, at steps 512, 514 server 404 sends the protected resource that was requested by client user 102.

If server 404 determines at steps 504, 506 that a cookie is not present with the request, or at steps 508, 510 that the cookie is not valid, then at steps 516, 518 the client user is re-directed to log-in server 112.

The log-in process illustrated at steps 212 through 216 of FIG. 5 is the same or similar to the similarly numbered steps that are illustrated in FIG. 2.

Figure 6:
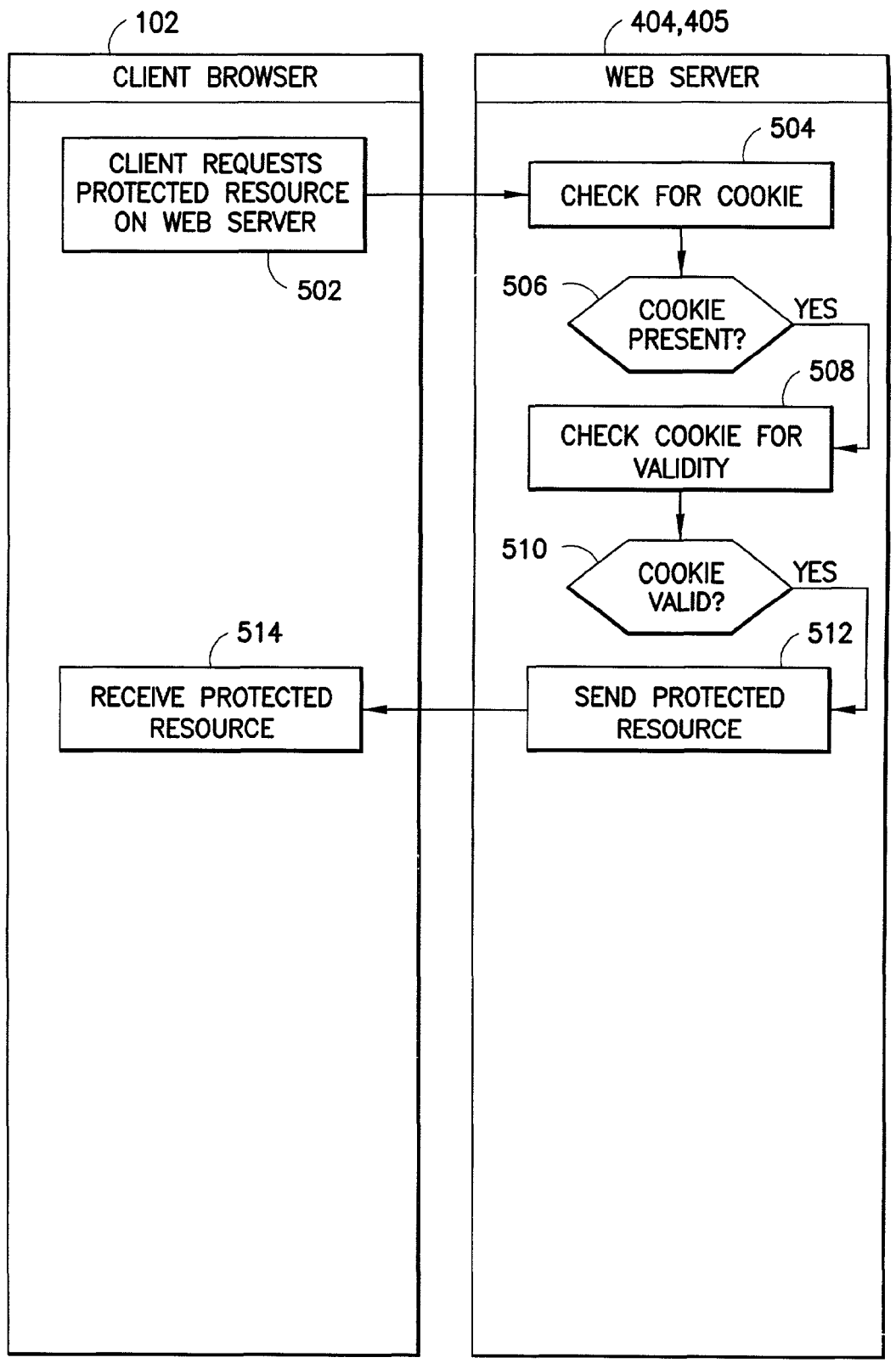
FIG. 6 illustrates an embodiment of a method according to the invention.

To simplify somewhat, FIG. 6 illustrates only some of the steps that are included in FIG. 5. Referring now to FIGS. 4 and 6 it is clear that after client user 102 has successfully logged in, for every request of a protected resource on server 404, the server first checks for a cookie at steps 504, 506, and then the server validates the cookie, or credential information from the cookie at steps 508, 510. Validation of the client user session credentials thereby occurs entirely within server 404 and SMS plug-in 405, and avoids the need for communication between server 404 and any other server. In this manner once a credential is granted and held, client user 102 will continue to be able to access protected resources on server 404. This is because the credential validation process does not rely on a separate session management server. Instead, session management is handled by SMS plug-in 405 within server 404.

Using a cryptographically generated cookie, such as described elsewhere, once credentialed by server 404, client 102 will also be able to access protected resources on the other servers (406, 408).

In the embodiments of the invention that are illustrated in FIGS. 4-6, log-in server 112 is separate and distinct from servers 404, 406, 408. As a distinct server, if the connection over networks 110, 114 to log-in server 112 is lost, or becomes unreliable, it will be difficult or impossible for new users to gain access to the protected resources of servers 404, 406, 408 because they will not be able to establish or get credentials. Similarly, if log-in server 112 goes down or becomes unreliable, new client users will be unable to gain access by establishing session credentials.

Figure 7:
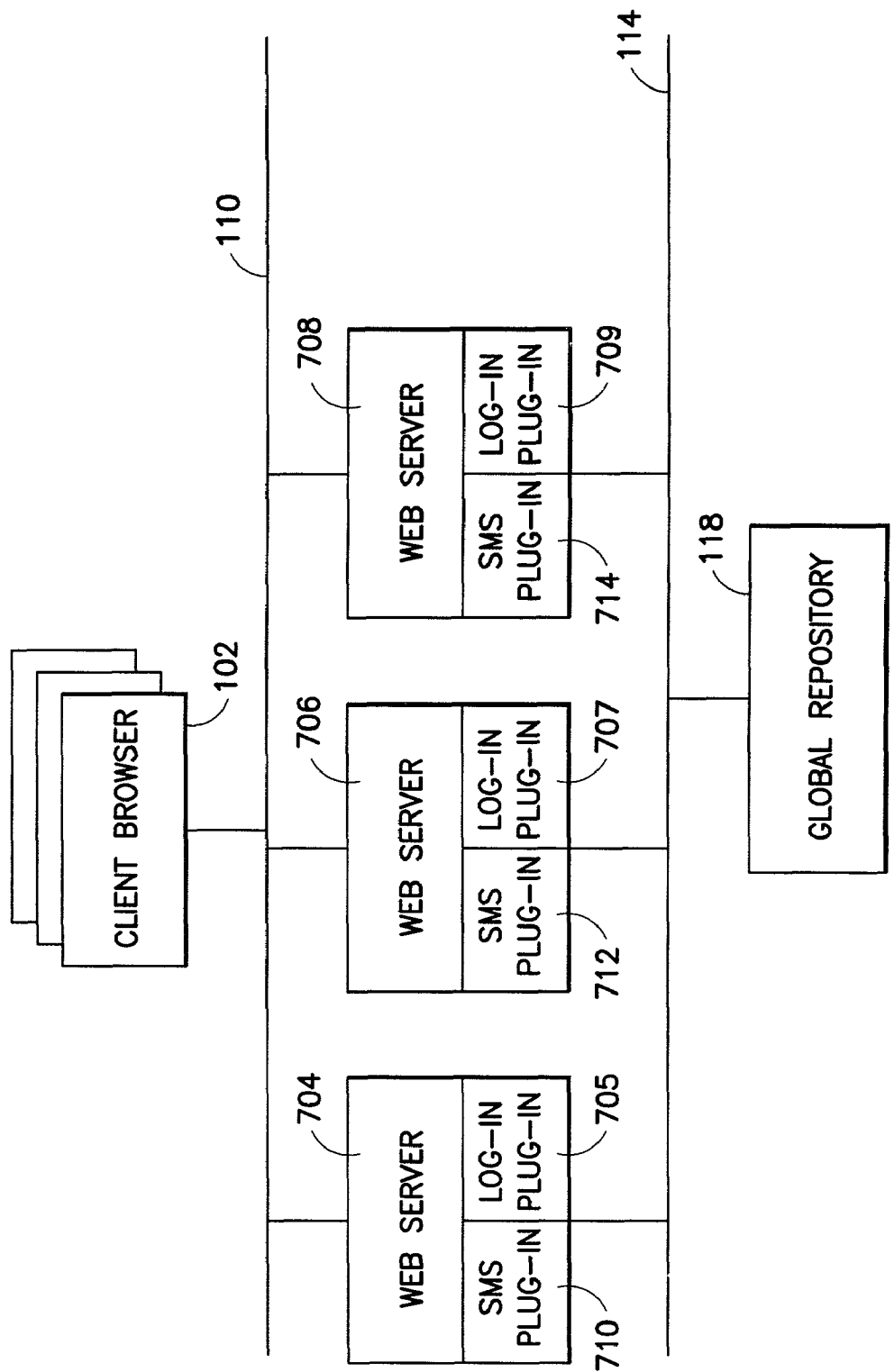
FIG. 7 illustrates an embodiment of a system according to the invention.

FIG. 7 illustrates an embodiment of the invention to address log-in. As illustrated in the embodiment of the invention in FIG. 7, log-in functions are replicated within each of servers 704, 706, 708. These log-in functions are handled as plug-ins 705, 707, 709 within respective servers 704, 706, 708. However, some form of synchronization is still necessary to ensure that the list of authorized users and accesses is maintained and available at each server 704, 706, 708 and respective log-in plug-in (705, 707, 709). To accomplish this synchronization, global repository 118 is connected to servers 704, 706, 708 by network 114. Although not illustrated, it is also possible that instead of a connection using separate network 114, global repository 118 is connected to servers 704, 706, 708 by network 110.

Figure 8:
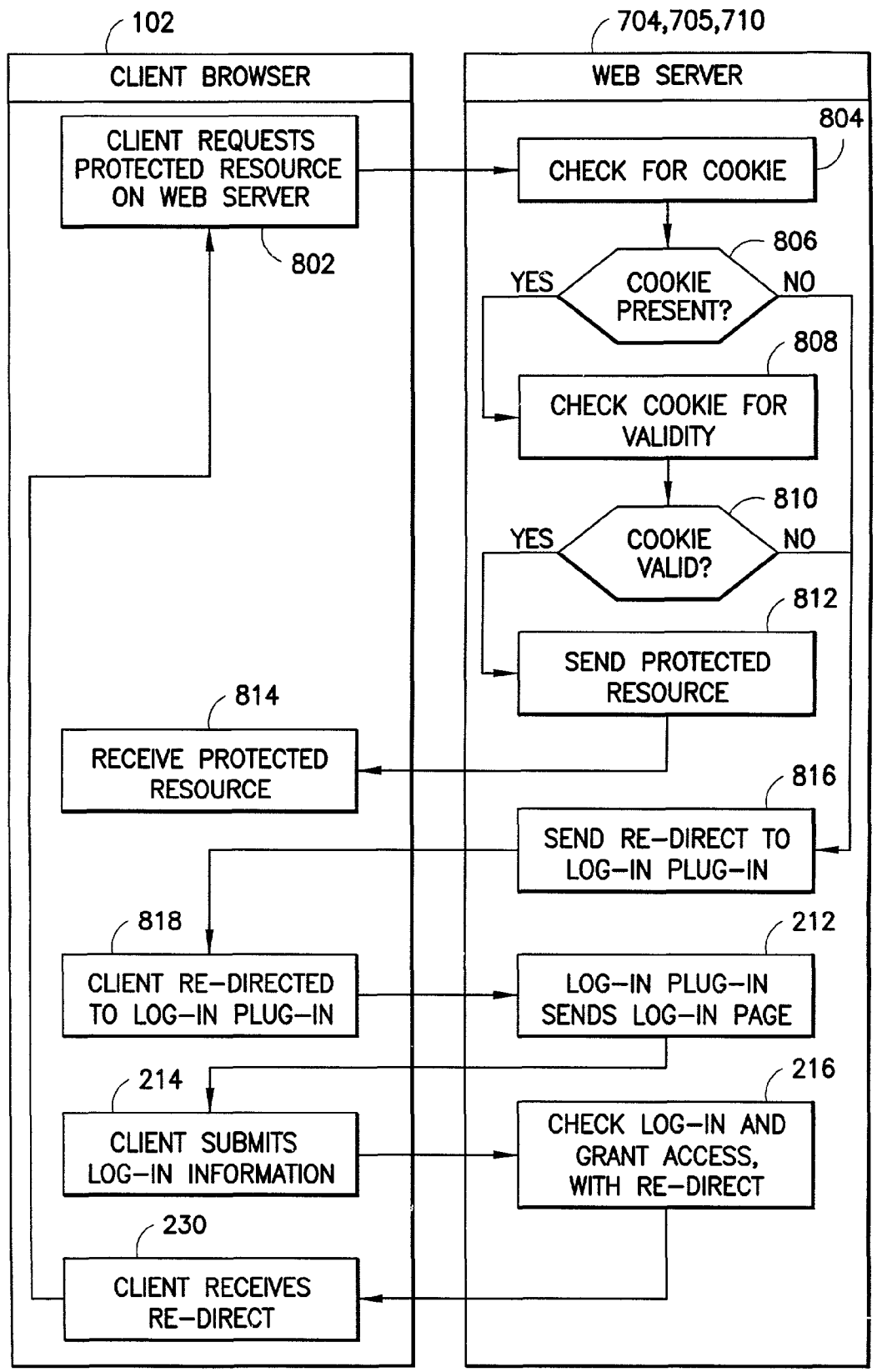
FIG. 8 illustrates an embodiment of a method according to the invention.

Referring now to FIGS. 7 and 8, in one embodiment, at step 802, client user 102 requests a protected resource on server 704.

At steps 804, 806, server 704 checks for a cookie in the request.

If a cookie is present in the request, then at steps 808, 810, the session management plug-in 710 of server 704 checks to see if the cookie is valid, and if valid, at steps 812, 814 server 704 sends the protected resource that was requested by client user 102.

If server 704 or session management plug-in 710 determines at steps 804, 806 that a cookie is not present with the request, or at steps 808, 810 that the cookie is not valid, then at steps 816, 818 the client user is re-directed to log-in plug-in 705.

It is also possible, although not illustrated, that log-in plug-in 705 and server 704 merely sends the log-in page at step 212, bypassing redirection steps 816 and 818.

The log-in process illustrated at steps 212 through 216 of FIG. 8 is the same or similar to the steps that are illustrated in FIG. 2, however the functions are performed by log-in plug-in 705, rather than by log-in server 112.

As illustrated and described, it is clear that client user 102 can successfully log-in at any of servers 704, 706, 708. This has the benefit of eliminating the need for a separate log-in server and also eliminates the need for a separate session management server to validate each client request for a protected resource. Instead, log-in and validation of the client user session credentials occurs entirely within server 704, 706, 708 using respective plug-ins and avoids the need for communication between servers 704, 706, 708 and any other server. In this manner, client user 102 can log-in and access protected resources on any of servers 704, 706, 708. This is because neither the log-in nor the credential validation process relies on a separate session management server or a separate log-in server. Instead, log-in and session management is replicated by plug-ins and handled within each of servers 704, 706, 708. Further, if a cryptographically generated cookie is available, such as described elsewhere, the session credentials from log-in to one server are valid and useable on any of the other servers.

Figure 9A:
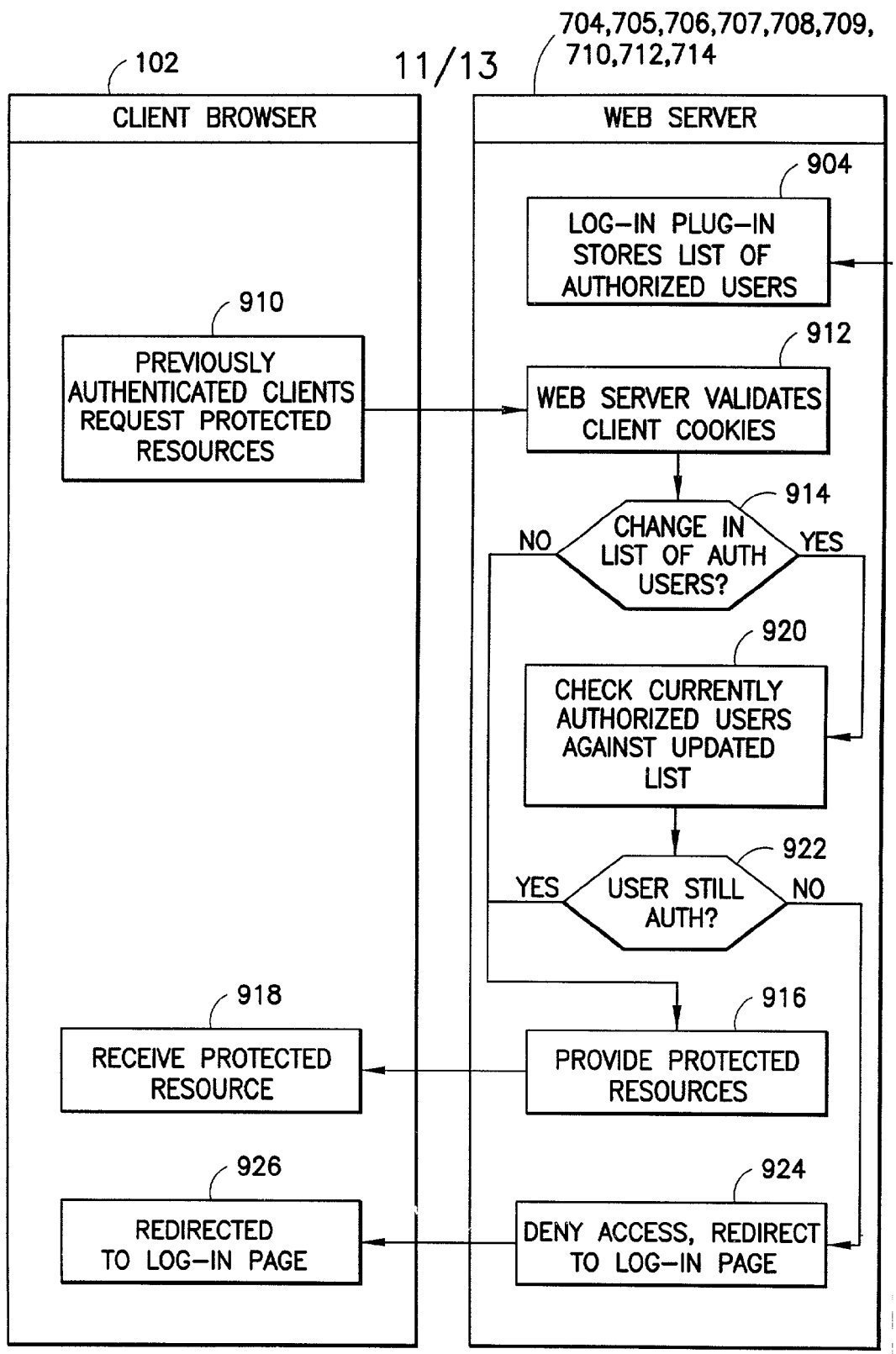
FIG. 9 illustrates an embodiment of a method according to the invention.

FIGS. 7 and 9 illustrate an embodiment of the invention and a technique to synchronize authorized client user information and modify or revoke credentials of a client user.

At steps 902, 904, global repository 118 sends a list of authorized client users and authorized accesses to each of log-in plug-ins 705, 707, 709. This may be a push of the information, or log-in plug-ins 705, 707, 709 may individually request the information from repository 118 on a regular basis. Log-in plug-ins 705, 707, 709 use this list of authorized client users and their respective access to create a session credential for any authorized client user 102 that attempts to gain access to a protected resource on any of servers 704, 706, 708. Once the log-in plug-in creates the session credential, client user 102 uses the credential in their requests for protected resources from any of servers 704, 706, 708. This is possible as long as the credential remains valid.

During either regular updates, or on an ad hoc basis, at step 906, repository 118 determines whether there is a change in the authorized users. The change can be addition or deletion of users, addition or deletion of particular accesses of users or changes to user entitlements. If there is no change in the authorized users, repository loops or does nothing. However, if there is a change in the authorized users, then at step 908, repository 118 pushes the update of the list of authorized users out to each of log-in plug-ins 705, 707, 709. To ensure that the most current information on authorized users is available to every log-in plug-in, this update is normally a push operation from repository 118, rather than a scheduled pull by log-in plug-ins 705, 707, 709.

In steps that are not illustrated in FIG. 9, client user 102 is authenticated and gets a session credential. Then, at step 910, the previously authenticated client user 102 requests access to a protected resource on server 704. At step 912, before granting access to the requested resource, session management plug-in 710 validates the session credentials of client user 102.

Assuming the client credentials are valid, then at step 914, server 704, or log-in plug-in 705 determines whether there has been a change in the list of authorized users. For example, a change in the list of authorized users could occur when repository 118 pushes an update to the list at step 908 and the log-in plug-in stores the update at step 904.

If there has been no change in the list of authorized users, then at steps 916, 918, server 704 provides the protected resource to client user 102.

However, if there has been a change in the list of authorized users, then at steps 920, 922 the client user is checked against the updated list to determine if the user remains authorized, or whether their current accesses must be changed.

If the particular client user was not affected by the update to the list, then at steps 916, 918 the requested protected resource is provided.

However, if the particular client user is no longer authorized, or their access has been changed for that particular resource, then at steps 924, 926 the access is denied and the client user is directed to the log-in page of the log-in plug-in 705. Alternatively, although not illustrated, the client user may be denied access to that particular protected resource, but allowed access to other protected resources.

An Example of Cryptographically Generated Cookies

Where session management is moved from a single or central server to individual plug-ins running on the individual servers, it is advantageous for credentials granted by one server to be useable by another server. Otherwise, the credentials do not truly provide single session sign-on. Therefore, a technique for creating and using cryptographically generating cookies is provided.

An example of a cryptographically generated cookie is provided below.

| 1 (4 bytes) | 2 (4 bytes) | 3 (8 bytes) | 4 (8 bytes) | 5 (8 bytes) | 6 (20 bytes) |
|---|---|---|---|---|---|

The layout of the data in the cookie is as follows:
1. Version, a 32-bit signed integer, network byte order
2. User ID, a 32-bit signed integer, network byte order. This field contains the user ID from the Global Repository
3. Last Activity, a 64-bit signed integer, network byte order. This field contains the time of last activity in milliseconds and in GMT, per the Java Date Implementation.
4. Session Start timestamp, a 64-bit signed integer, network byte order. This field contains the time at which the session started in milliseconds and in GMT, per the Java Date Implementation.
5. Maximum Session Idle Time, a 64 bit signed integer, network byte order. This field contains the maximum session idle time during the current session in milliseconds. The value will only increase in value during a session. One purpose of this field is to allow different idle time restrictions for different applications. For example if the current session was idle for 6 minutes on an application where the idle time restriction is 10 minutes, this field will reflect that 6 minutes of idle time. However, the session will not be terminated. If the user then attempts to connect to a different application, which has a maximum idle time restriction of 5 minutes, the user will not be allowed access because the maximum session idle time during the current session (6 minutes) is longer than the idle time restriction of the application (5 minutes).
6. Message Authenticator, a 160-bit HMAC. This field contains an SHA-1 HMAC of fields 1-5, computed using a key which is shared amongst the runtimes.

The entire credential is Base64-encoded into text format when it is placed in the client browser.

Using a cookie of this format, every time that client user 102 requests a protected resource from a server, the SMS plug-in of the server first checks for and decrypts the cookie, and then checks for validity of the cookie. Each of the SMS plug-ins can perform these checks because the key is shared by all of the servers.

Figure 10:
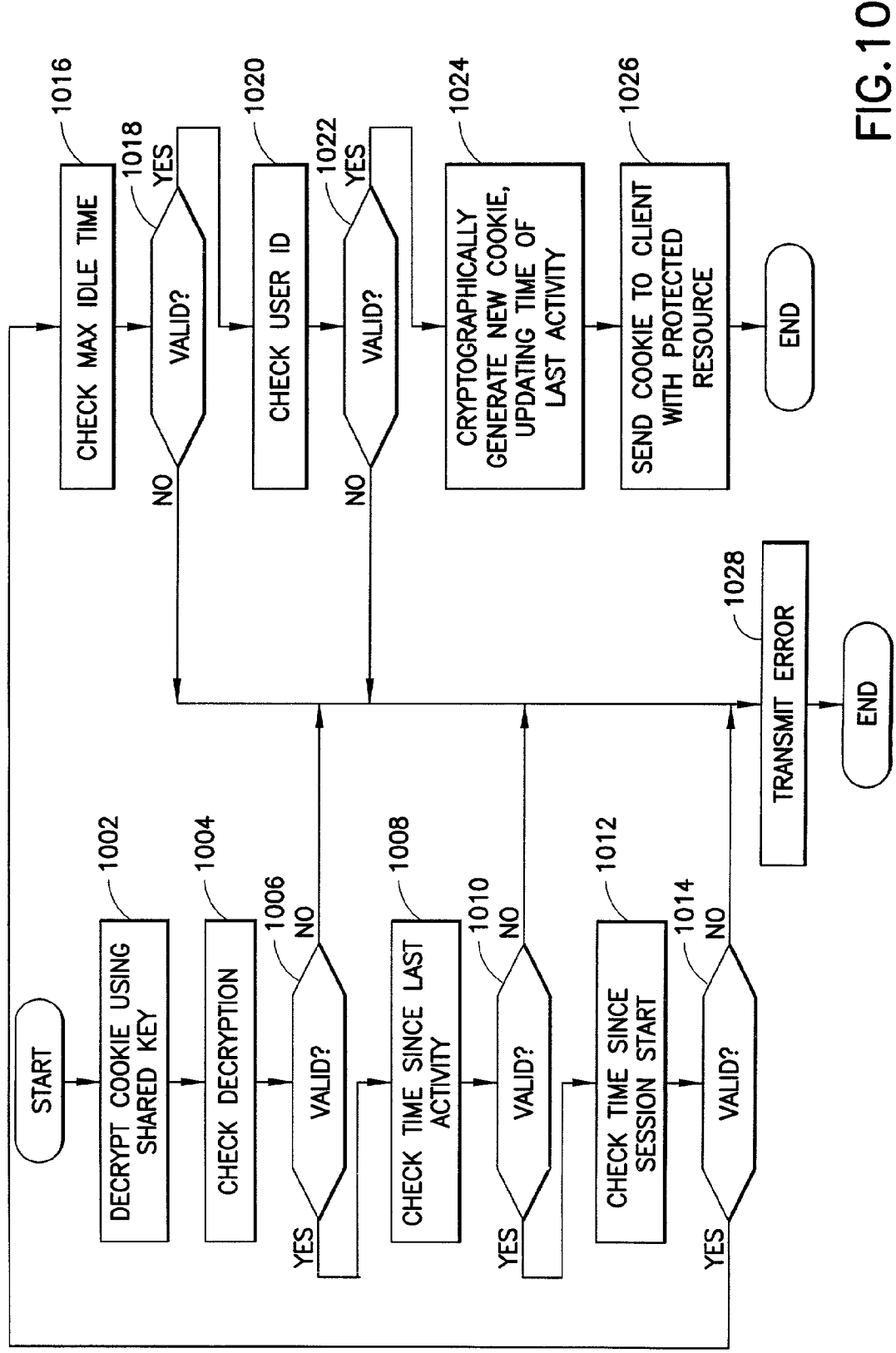
FIG. 10 illustrates an embodiment of a method according to the invention.

Referring now to FIG. 10, a method of an embodiment using a cryptographic cookie begins at step 1002, when the SMS plug-in of the server decrypts the cookie using the shared key.

At steps 1004, 1006 the SMS plug-in checks decryption validity. If the decryption is not valid, the plug-in generates an error message at step 1028 and ends.

If the decryption is valid, then at steps 1008, 1010, the SMS plug-in checks the time since last activity. If the time has exceeded a pre-set time, the plug-in generates an error message at step 1028 and ends.

If the time since last activity is valid, then at steps 1012, 1014, the SMS plug-in checks the time since session start. If the time has exceeded a pre-set time, the plug-in generates an error message at step 1028 and ends.

If the time since session start is valid, then at steps 1016, 1018, the server checks the maximum idle time value. If the maximum idle time exceeds the idle time restriction of the current application, the plug-in generates an error message at step 1028 and ends.

If the maximum idle time value is valid, then at steps 1020, 1022, the server checks the user ID. The server may perform this check, or it may be performed by the log-in plug-in running on the server. If the user ID is not valid, the server or plug-in generates an error message at step 1028 and ends or loops for further action, such as through any of the known techniques.

If the user ID is valid, then at step 1024, a new cryptographically generated cookie is created, updating the time of last activity. At step 1026, the new cookie is sent to the client with the protected resource.

It is possible that some of the checks illustrated in FIG. 10 are not performed at all, or that other checks are performed.

Although illustrative embodiments have been described herein in detail, it should be noted and will be appreciated by those skilled in the art that numerous variations may be made within the scope of this invention without departing from the principle of this invention and without sacrificing its chief advantages.

One such variation is the use of credentials to personalize content even though the requested resource may not be protected. In this way, the visual presentation or content is personalized according to the user.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A method for single sign-on session management, the method comprising:
    receiving, at a first server, a list of authorized users from a global repository, other servers also receiving the list of authorized users from the global repository, the first server and the other servers each having protected resources;
    establishing a session credential at the first server using the list of authorized users, the other servers also capable of establishing session credentials;
    sending the session credential from the first server to a client;
    receiving a protected resource request from the client at the first server, the protected resource request including the session credential established by the first server;
    responsive to receiving the session credential at the first server from the client, validating the session credential entirely within the first server, and upon validation of the session credential, granting the client access to a first protected resource at the first server;
    sending the session credential from the client to one of the other servers;
    receiving the session credential at the one of the other servers; and
    allowing the client access to a second protected resource at the one of the other servers based on the session credential that was established by the first server.

2. A method according to claim 1, further comprising updating a time value within the session credential at the first server.

3. A method according to claim 2, wherein the time value is a session timeout value.

4. A method according to claim 2, wherein the time value is a maximum idle time value.

5. A method according to claim 1, further comprising updating a time value within the session credential in conjunction with granting access to the resource of the first server.

6. A method according to claim 1, further comprising:
checking for presence of a session credential; and
if a session credential is not present, then establishing the session credential.

7. A method according to claim 1, wherein the session credential is contained within a token that is received by the one of the other servers.

8. A method according to claim 7, wherein the token is a cryptographically generated cookie.

9. A method according to claim 7, wherein the token is held by a client browser.

10. A method according to claim 1, wherein the validation of the session credential entirely within the first server comprises decrypting a cryptographically generated cookie.

11. A method according to claim 1, wherein the first resource is a protected resource.

12. A method for single sign-on session management, the method comprising:
providing a list of authorized users to a first server and second server from a global repository, the list of authorized users being sent from the global repository to the first server and the second server;
establishing a cryptographically generated first cookie at the first server using the list of authorized users;
sending the first cookie to a client browser as a session credential;
receiving the session credential from the client browser at the first server;
decrypting the first cookie at the first server;
validating the session credential entirely within the first server;
responsive to validating the session credential entirely within the first server, granting the client browser access to a first protected resource of the first server;
updating a timeout value contained within the session credential;
cryptographically generating a new session credential as a second cookie containing the updated timeout value;
sending the new session credential to the client browser;
sending the new session credential from the client browser to the second server;
receiving the new session credential at the second server;
decrypting the second cookie at the second server;
validating the new session credential within the second server; and
responsive to validating the session credential entirely at the second server, granting access to a second protected resource of the second server.

13. A computer readable medium having computer executable code stored thereon, the code for single sign-on session management, the code comprising:
code to provide a list of authorized users to a first server and a second server, the list received from a global repository;
code to establish a session credential at the first server using the list of authorized users;
code to send the session credential from the client to the first server;
code to receive the session credential at the first server;
code to validate the session credential entirely within the first server,
responsive to validating the session credential entirely at the first server, code to grant access to a first resource of the first server;
code to send the session credential from the client to the second server;
code to receive the session credential at the second server;
code to validate the session credential entirely within the second server; and
responsive to validating the session credential entirely at the second server, code to grant access to a second resource of the second server.

14. A method for single sign-on session management, the method comprising:
providing a list of authorized users to a first server and a second server, the list of authorized users being input from a global repository to the first server and the second server, both the first server and the second server having protected resources for access by the client;
establishing a session credential at the first server using the list of authorized users;
sending the session credential to a client;
sending the session credential from the client to the first server;
receiving, at the first server, the session credential from the client;
validating the session credential entirely within the first server, the validating being performed by a log-in plug-in running on the first server;
sending the session credential from the client to the second server;
receiving, at the second server, the session credential from the client;
validating the session credential entirely within the second server;
providing an update to the list of authorized users to the first server and to the second server, the update received from the global repository; and
changing, at the first server and the second server, the session credential based on the update to the list.

15. A method according to claim 14, further comprising granting access to a resource on the first server after validating the session credential.

16. A method according to claim 15, wherein the resource is a protected resource.

17. A method according to claim 14, wherein changing the session credential includes revoking access to a resource held by the first server.

18. A method according to claim 14, wherein changing the session credential includes adding access to a resource held by the first server.

19. A method according to claim 14, wherein changing the session credential includes removing access to a resources held by the first server.

20. A method according to claim 14, wherein providing a list of authorized users includes sending the list to the first and second servers.

21. A method according to claim 14, wherein providing a list of authorized users includes making the list available to the first and second servers.

22. A method according to claim 14, wherein providing an update to the list of authorized users includes sending the update to the first and second servers.

23. A method according to claim 14, wherein providing the list or update to the list of authorized users includes using a public network.

24. A method according to claim 14, wherein providing the list or update to the list of authorized users includes using a private network.

25. A method according to claim 14, wherein establishing a session credential includes cryptographically generating a cookie.

26. A method according to claim 14, wherein validating the session credential entirely within the first server includes using a session management plug-in running on the first server.

27. A method according to claim 14, wherein validating the session credential entirely within the first server includes decrypting a cryptographically generated cookie.

28. A system for single-sign-on session management, the system comprising:
   a global repository that generates a list of authorized users;
   a first server with a first resource, the first server inputting the list of authorized users from the global repository;
   a session management plug-in running on the first server that uses the list of authorized users to validate a session credential;
   a second server with a second resource, the second server inputting the list of authorized users from the global repository;
   a session management plug-in running on the second server that uses the list of authorized users to validate the session credential;
   a first network providing a connection between the global repository, the second server and the first server; and
   a client holding the session credential, the client connectable to the first server and to the second server by the first network, wherein:
   the first server entirely validates the session credential using only the session management plug-in running on the first server; and
   the second server entirely validates the session credential using only the session management plug-in running on the second server.

29. A system according to claim 28, further comprising a third server with an authorized list of users, the third server connectable to the first server and to the second server by a second network.

30. A system according to claim 29, wherein the first network and the second network are interconnected.

31. A system according to claim 29, wherein the first network and the second network are the same network.

32. A system according to claim 29, wherein the second network is a public network.

33. A system according to claim 29, wherein the second network is a private network.

34. A system according to claim 28, further comprising:
   a log-in plug-in running on the first server;
   a log-in plug-in running on the second server.

35. A system according to claim 28, wherein the first network is a public network.

36. A system according to claim 28, wherein the first network is a private network.

37. A system according to claim 28, wherein the session credential is a cryptographically generated cookie.

38. A system according to claim 28, wherein the resource on the first server is a protected resource.

39. The method according to claim 1, further including:
   updating the list of authorized users by adding and deleting users.

40. The method according to claim 1, further including:
   updating the list of authorized users by changing accesses of users.

41. The method according to claim 1, further including:
   updating the list of authorized users by changing entitlements of users.

42. A system for single-sign-on session management, the system comprising:
   a global repository that generates a list of authorized users;
   multiple servers, each of the multiple servers inputting the list of authorized users from the global repository;
   protected resources residing on each of the multiple servers;
   multiple log-in plug-ins, each of the multiple servers running one of the multiple log-in plug-ins, wherein each of the log-in plug-ins uses the list of authorized users to establish session credentials, such that each of the multiple servers is capable of independently establishing the session credentials; and
   multiple session management plug-ins, each of the multiple servers running one of the session management plug-ins, wherein each of the session management plug-ins processes the session credentials established by any one of the multiple log-in plug-ins in order to validate a user session, thereby enabling user access to a requested protected resource on any of the multiple servers.

\* \* \* \* \*